United States Patent
Rodriguez

(10) Patent No.: US 10,012,098 B2
(45) Date of Patent: Jul. 3, 2018

(54) MID-SECTION OF A CAN-ANNULAR GAS TURBINE ENGINE TO INTRODUCE A RADIAL VELOCITY COMPONENT INTO AN AIR FLOW DISCHARGED FROM A COMPRESSOR OF THE MID-SECTION

(75) Inventor: Jose L. Rodriguez, Lake Mary, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1062 days.

(21) Appl. No.: 13/407,987

(22) Filed: Feb. 29, 2012

(65) Prior Publication Data

US 2013/0224007 A1 Aug. 29, 2013

(51) Int. Cl.
*F02C 3/14* (2006.01)
*F01D 9/04* (2006.01)

(52) U.S. Cl.
CPC .............. *F01D 9/041* (2013.01); *F02C 3/14* (2013.01)

(58) Field of Classification Search
CPC .. F23R 3/04; F02C 3/08; F04D 29/542; F04D 29/44–29/444; F04D 29/541; F04D 29/681; F04D 29/4206; F04D 29/30
USPC ....... 60/751, 39.37; 415/207, 224.5; 416/23, 416/147, 155
See application file for complete search history.

(56) References Cited

U.S. PATENT DOCUMENTS

| | | | | |
|---|---|---|---|---|
| 2,396,068 A | * | 3/1946 | Youngash | F02C 3/32 60/39.37 |
| 2,445,114 A | * | 7/1948 | Halford | F02K 1/822 244/74 |
| 2,473,356 A | * | 6/1949 | Birmann | F02C 6/003 415/199.2 |
| 2,567,079 A | * | 9/1951 | Owner | F23R 3/425 415/183 |
| 2,593,523 A | * | 4/1952 | Bauger | F02C 5/10 60/39.38 |
| 2,594,042 A | * | 4/1952 | Lee | F02C 7/04 415/147 |
| 2,625,794 A | * | 1/1953 | Williams et al. | 60/726 |
| 2,627,721 A | * | 2/1953 | Rosenlund | 60/751 |
| 2,647,684 A | * | 8/1953 | Lombard | F01D 11/04 60/39.37 |
| 2,663,141 A | * | 12/1953 | Hage | F02C 3/103 12/142 F |
| 2,969,642 A | * | 1/1961 | Colby | 60/39.01 |
| 3,019,606 A | * | 2/1962 | Franz | 60/759 |
| 3,045,894 A | * | 7/1962 | Ross | F02C 9/20 415/131 |
| 3,088,278 A | * | 5/1963 | Franz | 60/791 |
| 3,546,880 A | * | 12/1970 | Schwaar | 60/792 |
| 3,738,105 A | * | 6/1973 | Buchelt | 60/39.37 |
| 3,832,089 A | * | 8/1974 | Moellmann | 415/207 |

(Continued)

Primary Examiner — Ted Kim

(57) ABSTRACT

A midframe portion (113) of a gas turbine engine (110) is provided, including a compressor section (112) with a last stage blade (124). The compressor section (112) is configured to introduce a radial velocity component into an air flow (111) such that the air flow is discharged from the compressor section (112) at a mixed direction based on a combined longitudinal velocity component and radial velocity component. The midframe portion (113) further includes a manifold (121) to directly couple the air flow from an outlet of the compressor section (112) to an inlet of a respective combustor head (118) of the gas turbine engine (110).

9 Claims, 13 Drawing Sheets

(56) References Cited

U.S. PATENT DOCUMENTS

| | | | |
|---|---|---|---|
| 4,081,957 A * | 4/1978 | Cox, Jr. | 60/751 |
| 5,207,054 A * | 5/1993 | Rodgers et al. | 60/804 |
| 5,317,865 A * | 6/1994 | Inoue et al. | 60/804 |
| 6,035,627 A * | 3/2000 | Liu | 60/785 |
| 6,968,696 B2 | 11/2005 | Little | |
| 7,086,233 B2 | 8/2006 | Chehab et al. | |
| 7,096,673 B2 | 8/2006 | Little et al. | |
| 7,107,773 B2 | 9/2006 | Little | |
| 7,721,547 B2 | 5/2010 | Bancalari et al. | |
| 2011/0271654 A1 * | 11/2011 | Siden | 60/39.37 |

* cited by examiner

MID-SECTION OF A CAN-ANNULAR GAS TURBINE ENGINE TO INTRODUCE A RADIAL VELOCITY COMPONENT INTO AN AIR FLOW DISCHARGED FROM A COMPRESSOR OF THE MID-SECTION

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to can-annular gas turbine engines, and more specifically, to a midframe portion of a can-annular gas turbine engine.

BACKGROUND OF THE INVENTION

A conventional midframe design for a can-annular gas turbine engine is discussed in U.S. Pat. No. 7,721,547 ("'547 patent"), assigned to the assignee of the present invention, which is incorporated by reference herein. FIG. 1 of the '547 patent is reproduced as FIG. 1 herein, and illustrates a cross-section through a midframe portion 13 of a conventional can-annular gas turbine engine 10. The major components of the gas turbine engine 10 are a compressor section 12, a combustion section 16 and a turbine section 48. A rotor assembly 17 is centrally located and extends through the three sections. In operation, the compressor section 12 receives air through an intake (not shown) and compresses it. The compressed air flow 11 passes from the compressor section 12 to an axial diffuser 14, after which the air flow 11 enters a chamber 15 within a casing 19, where the total air flow 11 is separated and enters one of the multiple combustor heads 18 of the can-annular combustion section 16 that encircle the rotor assembly 17 in an annular configuration.

As illustrated in FIG. 1, the compressor section 12 includes cylinders 27,29 that enclose alternating rows of stationary vanes 23 and rotating blades 25. The stationary vanes 23 can be affixed to the cylinder 27 while the rotating blades 25 can be mounted to the rotor assembly 17 for rotation with the rotor assembly 17. The stationary vanes 23 include a last stationary vane 26 and an outlet guide vane 28 positioned adjacent to an outlet of the compressor section 12. Additionally, the rotating blades 25 include a last stage blade 24 positioned upstream from the last stationary vane 26 and the outlet guide vane 28. The last stationary vane 26 and outlet guide vane 28 are used to remove an absolute tangential swirl angle (measured in an absolute reference frame with respect to the longitudinal direction) of the air flow 11 coming off the last stage blade 24.

As further illustrated in FIG. 1, load-bearing struts 30 are provided to support a shaft cover 32 of the rotor assembly 17 at the casing 19 of the combustion section 16. As appreciated by one of skill in the art, one strut 30 may be provided per each one to four combustor heads 18. As illustrated in FIG. 1, the axial diffuser 14 includes an inner cone 36 and an outer cone 34 and the cross-sectional area between the inner and outer cones 36,34 increases in the longitudinal direction 68, such that the air flow 11 expands and decelerates through the diffuser 14, thereby converting velocity head into pressure head. As illustrated in FIG. 1, the strut 30 is attached between a shaft cover 32 to the outer cone 34 of the axial diffuser 14, and thus the casing 19 of the combustion section 16 supports the strut 30 at the shaft cover 32.

As further illustrated in FIG. 1, a rotor-cooling extraction pipe 38 is provided, which extracts compressed air from the chamber 15 and passes the compressed air into a cooler 42. The cooled air passes from the cooler 42 and through rotor-cooling injection pipes 40 that is positioned within the chamber 15 and directs the cooled air below the shaft cover 32, to cool the rotating components of the engine.

Another portion of the engine needing cooling is a turn in the transition 20 at an inlet to the turbine section 48, which typically experiences an especially high heat flux during an operation of the gas turbine engine 10. In order to cool a rear end 54 of the transition 20 during operation of the gas turbine 10, a portion 58 of the air flow 11 entering the chamber 15 makes contact with the rear end 54 of the transition 20 proximate the highest heat flux region in order to cool the rear end 54 of the transition 20 using thermal convection.

FIG. 8 of the '547 patent is reproduced herein as FIG. 2, and illustrates a "trans-vane" transition 20' which improves upon the transition 20 of FIG. 1. FIG. 2 illustrates a top down radial view of the midframe portion 13' of the gas turbine engine 10' including the combustion section 16' and a first stage turbine blade array 49' of the turbine section 48' located downstream from the combustion section 16', with the trans-vane transition 20' located therebetween. The midframe portion 13' of FIG. 2 includes a compressor section (not shown) similar to the compressor section 12 of FIG. 1. A first stage housing encloses the first stage turbine blade array 49' and includes a blade ring 51'. An upstream side 53' of the blade ring 51' is preferably adapted to couple to a transition outlet 55'. The trans-vane transition 20' includes a transition duct body 60' with an inlet 62' to receive a gas flow exhausted from the combustor section 16' and the outlet 55' to discharge a gas flow toward the first stage blade array 49' with an internal passage 66' therebetween. The outlet 55' is offset from the inlet 62' in the three coordinate directions—in the radial direction (in/out of the figure), the longitudinal direction 68 and the tangential direction 70'. The gas flow discharged from the outlet 55' is angled in the tangential direction 70' within an absolute reference frame, relative to the longitudinal direction 68 as depicted by the arrow 72', as required by the first stage turbine blade array 49'. A brief discussion will be provided of the absolute and relative reference frames of the midframe portion 13', as well as how the velocity vector of an air flow exiting the compressor and entering the turbine 48' of the gas turbine engine 10' is represented in each of those reference frames. FIG. 3 illustrates a top down radial view of the last stage blade 24 of the compressor section 12 of the gas turbine engine 10' and the first stage blade 49' of the turbine 48' of the midframe portion 13', separated along a longitudinal axis 75 of the conventional gas turbine engine 10' of FIG. 2. An outgoing air flow off the last stage blade 24 is oriented in the (relative) reference frame of the last stage blade 24 along a relative outgoing velocity vector 76. During an operation of the compressor section 12, the last stage blade 24 rotates around the longitudinal axis 75 with a blade velocity vector 78 that is oriented perpendicular to the longitudinal axis 75. In order to determine the velocity vector of the outgoing air flow off the last stage blade 24 in an absolute reference frame, the blade velocity vector 78 is added to the relative outgoing velocity vector 76, resulting in an absolute outgoing velocity vector 80 that is angled in the tangential direction 70 by an angle 82, relative to the longitudinal direction 68. In an exemplary embodiment, the angle 82 is approximately 45 degrees. Accordingly, the absolute outgoing velocity vector 80 of the outgoing air flow off the last stage blade 24 is oriented approximately 45 degrees in the tangential direction 70, relative to the longitudinal direction 68. The last stage vanes 26,28 of the conventional midframe portion 13' are configured to reduce the angle 82 of the absolute outgoing velocity vector 80 from 45 degrees to approximately 0 degrees, to align the air flow along the longitudinal axis 75. However, as discussed below, the embodiments of the present invention do not utilize the last stage vanes, and thus utilize the initial angle 82 of the absolute outgoing velocity vector 80 off the last stage blade 24. FIG. 3 also illustrates an incoming air flow to the first stage blade 49' of the turbine 48' illustrated in FIG. 2. In order to maximize the effectiveness of the turbine 48', the incoming air flow is oriented in the (relative) reference frame of the first stage blade 49' along a relative incoming velocity vector 84. During an operation of the turbine 48', the first stage blade 49' rotates around the longitudinal axis 75 with a blade velocity 86 that is oriented perpendicular to the longitudinal axis 75. In order to determine the velocity vector of the incoming air flow in the absolute reference frame, the blade velocity vector 86 is added to the relative incoming velocity vector 84, resulting in an absolute incoming velocity vector 88 that is angled in the tangential direction 70 by an angle 90, relative to the longitudinal direction 68. In an exemplary embodiment, the angle 90 is approximately 70 degrees. Accordingly, the absolute incoming velocity vector 88 of the incoming air flow onto the first stage blade 49' of the turbine 48' is oriented approximately 70 degrees in the tangential direction 70, relative to the longitudinal direction 68. In contrast with the transition 20' of FIG. 2, the transition 20 illustrated in FIG. 1 discharges a gas flow to the turbine section 48 with an offset in only the radial direction and the longitudinal direction 68, and thus the gas flow is not angled in the tangential direction relative to the longitudinal direction 68. Since the first stage turbine blade array 49 of the turbine section 48 requires an incoming gas flow that is angled in the tangential direction relative to the longitudinal direction 68, the turbine section 48 of FIG. 1 includes a first stage vane 74, to introduce an offset in the tangential direction for the gas flow discharged from the transition 20. However, by implementing the trans-vane design in the transition 20', the gas flow is discharged from the outlet 55' at the necessary angle 90 in the tangential direction 70 relative to the longitudinal direction 68 to accommodate the first stage turbine blade array 49', and thus the first stage vanes 74 are not needed. In the '547 patent, the inventors made various improvements to the midframe portion of the gas turbine engine, downstream of the combustion section, to enhance the operating efficiency and/or cost efficiency of the gas turbine engine. In the present invention, the present inventors make various improvements to the midframe portion of the gas turbine engine, upstream of the combustion section, to also enhance the operating efficiency and/or cost efficiency of the gas turbine engine.

SUMMARY OF THE INVENTION

The specification and drawings presented here describe a plurality of synergistic improvements for the midframe section of a can-annular gas turbine engine. Various combinations of these improvements may be implemented in any particular single engine design. The identical specification and drawings as presented here are submitted for several different patent applications. While the entire disclosure is provided in support of each individual patent application, the detailed description of the invention related to FIGS. 4, 5 and 8 may be of particular importance to this invention.

The present inventors have recognized that significant improvements in the operating efficiency, cost efficiency and/or cooling efficiency of a can annular gas turbine engine may be obtained by innovation in the design of the mid-section of the engine. The inventors have recognized that the movement of air from the compressor section to the combustor section in a can-annular gas turbine engine is a generally unstructured, chaotic process. Compressed air produced by the compressor section is directed into the annular chamber 15 and is allowed to find its path of least resistance around various structural obstacles and into one of the respective combustor heads 18. As a result, the flow experiences turbulence and fluid friction induced pressure losses. The present inventors have recognized that an improved engine mid-section design can minimize such losses, thereby providing improved overall engine performance. In addition, the present inventors have recognized that an improved engine mid-section design can also minimize losses associated with cooling the mid-section during operation, as well as lowering the manufacturing cost of the mid-section.

The air flow 11 experiences aerodynamic loss based on a total angle of rotation while traveling from the compressor section 12 to one of the combustor heads 18. The last stationary vane 26 and outlet guide vane 28 collectively rotate the air flow 11 by an initial absolute tangential swirl angle to remove the initial absolute tangential swirl angle that is imparted by the rotating blades 24, such as 45 degrees, to align the air flow 11 in a downstream longitudinal direction 68 upon entering the axial diffuser 14. In addition to the initial absolute tangential swirl angle rotation, upon exiting the diffuser 14 and entering the chamber 15, the air flow 11 experiences two 180 degree rotations: a first approximate 180 degree rotation to orient the air flow 11 from an initial downstream longitudinal direction 68 to an upstream longitudinal direction to travel longitudinally backward to a respective combustor head 18, and a second approximate 180 degree rotation at the combustor head 18 to direct the air flow 11 into an inlet of the combustor head 18. Accordingly, the air flow 11 undergoes a total rotation of approximately 400 degrees while traveling from the compressor section 12 to one of the combustor heads 18, and most of this rotation is accomplished in the unstructured environment of the chamber 15. The present inventors have recognized that the aerodynamic efficiency of the air flow from the compressor section to the respective combustor head can be enhanced by reducing this total rotation of the air and/or controlling the rotation process more precisely. For example, a radial velocity component may be introduced to the air flow at the diffuser outlet, such that the air flow is either a mixed-flow (which has combined longitudinal, tangential and radial velocity components) or a radial flow (which has a substantially radial velocity component) at the diffuser outlet. By introducing the radial velocity component to the air flow at the diffuser outlet, the required total angle of rotation within the chamber 15 will be decreased, and the aerodynamic efficiency of the air flow from the compressor section to the respective combustor head would be enhanced. The mixed-flow or radial flow may be initiated in the compressor section, in the diffuser, or at an interface between the compressor section and the diffuser, in various embodiments.

As discussed above, the last stage vane and outlet guide vane of a prior art can-annular gas turbine engine 10 are provided to eliminate the initial tangential swirl angle of approximately 45 degrees that is imparted by the rotating compressor blades 24, so that the air flow is directed into the chamber 15 along a downstream longitudinal direction (0 degree tangential swirl angle). The present inventors have recognized that some transition designs, such as the trans-vane design discussed above in FIG. 2, require a final absolute tangential swirl angle (with respect to the longitudinal direction 68) to be output from the transition 20' to the first stage blade 49' of the turbine section 48' which is greater than the initial absolute tangential swirl angle generated by the last stage blade of the compressor section. For example, in an exemplary embodiment, a trans-vane design requires a final absolute tangential swirl angle of 70 degrees to the first stage blade 49' of the turbine section 48', in excess of the initial absolute tangential swirl angel of 45 degrees off the last stage blade 24 of the compressor section. The present inventors have recognized that it would be advantageous to maintain and then augment the initial absolute tangential swirl angle off the last stage blade of the compressor section rather than the prior art practice of eliminating it through the last stage compressor vane 26 and outlet guide vane 28 and replacing it through the transition 20' to the first stage blade 49' of the turbine section 48'. The inventors have recognized that the initial absolute tangential swirl angle off the last stage blade of the compressor section can be increased by an offset angle through a trans-vane transition so that the absolute tangential swirl angle of the air flow output from the trans-vane transition fulfills the required final absolute tangential swirl angle incident on the first stage blade 49'. This offset angle through the transition may be 25 degrees, for example, which is additive to the 45 degree angle provided by the last stage compressor blades 24 to achieve a required 70 degree tangential angle at the first stage turbine blade 49', thereby eliminating the need for the last stage compressor vane 26 and outlet guide vane 28. By maintaining or supplementing the initial absolute tangential swirl angle of the air flow off the last stage blade of the compressor section, the air flow can be passed from the compressor outlet to a respective combustor head with a substantially reduced total angle of rotation when compared to the conventional design, thereby enhancing the aerodynamic efficiency of the midframe portion of the gas turbine engine.

The present inventors have also recognized that the aerodynamic efficiency of the air flow 11 from the compressor section 12 to the combustor heads 18 may be enhanced by directly coupling the air flow from respective sections of the compressor-diffuser outlet to each individual combustor head inlet. In the prior art, the compressed air flow 11 passes from the compressor section 12 to the axial diffuser 14, after which the air flow 11 enters the chamber 15 within the casing 19, where the air flow 11 experiences aerodynamic loss in the process of randomly entering any of the multiple combustor heads 18 within the chamber 15. Upon exiting the diffuser 14 and entering the chamber 15, the air flow 11 also experiences aerodynamic losses as a result of making contact with the load-bearing struts 30, the rotor-cooling injection pipes 40 and a near side 22 of the transition 20, which are each positioned adjacent to the outlet of the diffuser 14. By directly coupling the air flow 11 from the compressor-diffuser outlet to a respective combustor head inlet as described herein, the air flow avoids entering the chamber altogether, thereby allowing for the reduction of the aerodynamic losses associated with randomly entering one of the multiple combustor heads 18. Additionally, if a mixed-flow diffuser is designed that is radially inclined with respect to the shaft cover, a strut could be designed and attached to an inner cone of the diffuser, since the inner cone would be radially shifted outward from the shaft cover. Thus, the strut would not affect the air flow exiting from the outlet of the mixed-flow diffuser, thereby not affecting the aerodynamic efficiency of the air flow between the compressor section and each combustor head in the improved midframe design. To transfer a load from the casing of the midframe to the shaft cover, an outer cone of the mixed flow diffuser is secured to the casing, to first transfer the load from the casing to the outer cone. The mixed-flow diffuser features a plurality of vanes positioned between the inner and outer cones, to transfer the load from the outer cone to the inner cone, and the vanes would provide structural integrity for supporting the casing at the shaft cover. The strut attached to the inner cone would subsequently transfer the load from the inner cone to the shaft cover. As previously discussed, the conventional design of the midframe portion of the gas turbine engine includes a rotor cooling injection pipe which passes into the casing chamber near the outlet of the diffuser, thus affecting the air flowing from the diffuser. A midframe design in which the compressor outlet is coupled to a respective combustor head 18 may have the rotor cooling extraction pipe repositioned to draw compressed air from the chamber by extending the rotor cooling extraction pipe through several of the vanes which define each passage in the mixed-flow diffuser. Additionally, the rotor cooling injection pipe could be repositioned to pass through the vanes of the mixed-flow diffuser, and thus the rotor cooling injection pipe would no longer affect the air flow discharged from the diffuser, which further enhances the aerodynamic efficiency of the air flow between the compressor section and each combustor head.

The conventional design of the midframe portion 13 of the gas turbine engine 10 features several components aligned along the axis of the compressor section, such as the last stage blade 24, the last stage vane 26, the outlet guide vane 28 and the axial diffuser 14, for example. The amount of material used to form these components and/or the longitudinal length of these components along the midframe portion of the gas turbine engine collectively contribute to the cost of manufacturing the gas turbine engine. In accordance with an aspect of the invention when either mixed-flow or radial flow of air is provided from a diffuser outlet, one or more of the prior art axial compressor stages could be replaced with a newly designed last stage blade which initiates a mixed-flow or radial flow to be outputted from the compressor section. Thus, by replacing one or more axial compressor stages with a mixed-flow or radial flow at the compressor outlet, the longitudinal length of components and/or the amount of material used to form the midframe portion of the engine is reduced, which lowers the cost of manufacturing the midframe portion of the turbine engine.

As discussed above, the conventional design of the midframe portion of the gas turbine engine features passing the air flow 11 from the axial diffuser 14 outlet into the chamber 15, after which a portion 58 of this air flow is used to cool a rear end 54 of the transition 20, which experiences increased temperature during operation of the gas turbine engine 10. The cooling efficiency of this design is limited by the limited volume of air flow which makes contact with the transition relative to the entire air flow which is output from the axial diffuser. Aspects of the present invention address this limiting factor, by providing a cowling to encircle the rear end of the transition to receive all of the compressed air flow from the compressor section and to cool the rear end of the transition using thermal convection of the air flow within the cowling at the rear end of the transition. After using the air flow within the cowling to cool the rear end of the transition, the compressed air flow may exit from an outlet in the cowling, enter into the chamber and subsequently enter into one of the multiple combustor heads. In an alternate embodiment, a manifold may directly couple the air flow from a respective portion of the compressor outlet to a respective cowling to cool the rear end of a respective transition, and then the manifold may directly couple the air flow to a respective compressor head.

BRIEF DESCRIPTION OF THE DRAWINGS

The invention is explained in the following description in view of the drawings that show.

DETAILED DESCRIPTION OF THE INVENTION

The description below is organized into two major sections: 1) a description of alternatives for generating mixed flow or radial flow in the turbine midsection, and 2) a description of alternatives for delivering the mixed flow or radial flow to the combustor head-end.

1. Initiation of Mixed-Flow or Radial Flow

Figure 7:
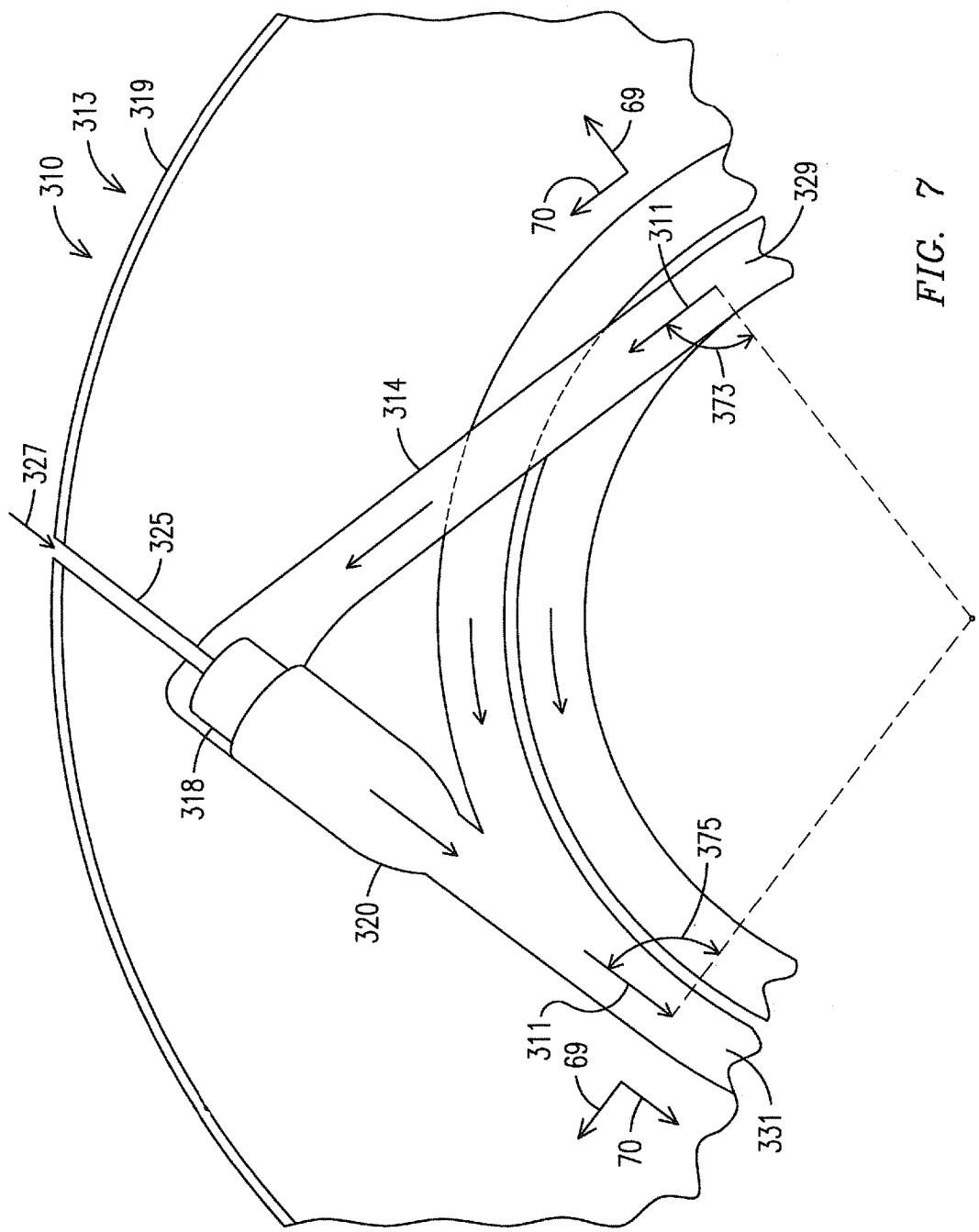
FIG. 7 is a partial longitudinal view of a linear diffuser duct within a turbine engine.
Figure 8:
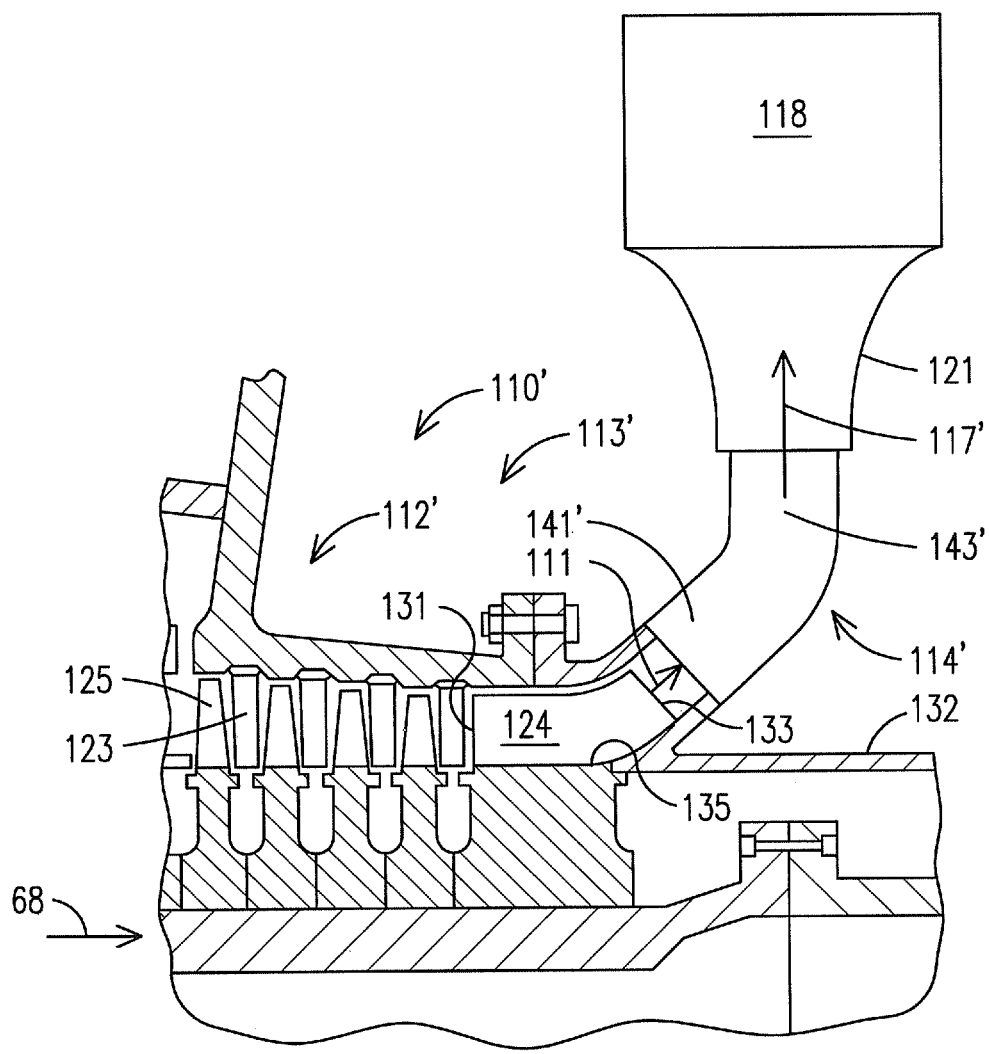
FIG. 8 is a cross-sectional view of a mixed-flow diffuser within a turbine engine.

As discussed above, the inventors of the present invention recognized that an improved midframe portion of the gas turbine engine features initiating a mixed air flow (axial, tangential plus radial flow velocities) or a completely radial air flow from the diffuser outlet. By initiating the mixed-air flow or radial air flow from the diffuser outlet, the air flow passes from the diffuser outlet to the combustor head inlet while undergoing a reduced total angle of rotation when compared to the air flow with the conventional midframe portion. The embodiments of the present invention discussed below in FIGS. 4-8 introduce various midframe designs in which the mixed air flow or radial air flow is introduced in the compressor section (FIGS. 4-6), the diffuser (FIG. 7) or within a combination of both the compressor section and the diffuser (FIG. 8).

A. Mixed Flow Initiated in the Compressor

Figure 4:
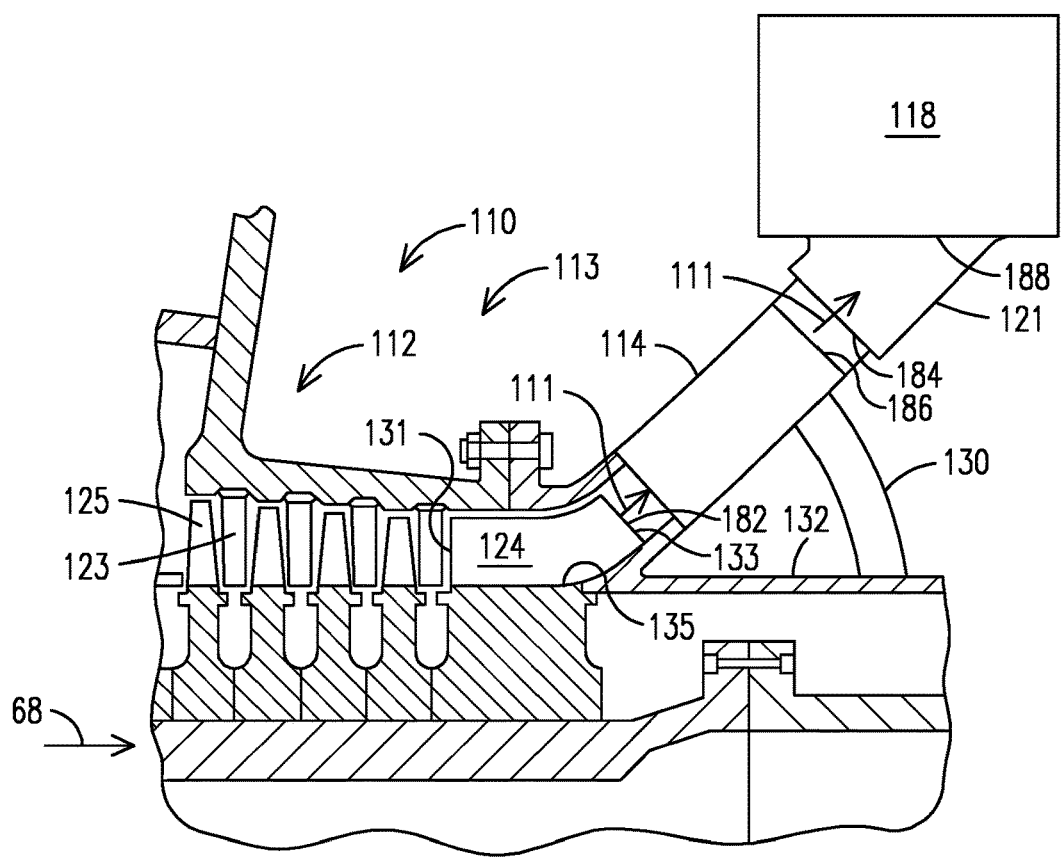
FIG. 4 is a cross-sectional view of a mixed-flow diffuser within a turbine engine.

FIG. 4 illustrates a midframe portion 113 of a gas turbine engine 110, where the midframe portion 113 includes a compressor section 112 having alternating stationary vanes 123 and rotating blades 125 which can be mounted to the rotor assembly (not shown) for rotation with the rotor assembly. However, unlike the compressor section 12 of the conventional gas turbine 10 of FIG. 1, the compressor section 112 includes a redesigned last stage blade 124 that provides a radial flow velocity component to the compressed air. Additionally, unlike the compressor section 12 of the conventional gas turbine 10 of FIG. 1, the compressor section 112 does not include a last stage vane 26 nor an outlet guide vane 28, although in certain designs the compressor section 112 may retain a last stage vane and/or an outlet guide vane to adjust a swirl angle of the air flow for purposes of directing the air flow into a diffuser 114, as discussed in greater detail below. The last stage blade 124 is designed to initiate a mixed air flow 111 within the compressor section 112, such that the mixed air flow 111 has combined radial and longitudinal (axial) velocity components upon discharging through an outlet 182 of the compressor section 112 and entering a mixed-flow diffuser 114. The mixed air flow 111 is initiated in the compressor section 112 by the last stage blade 124, which includes a leading edge 131 substantially aligned with the leading edges of the stationary vanes 123 and the rotating blades 125 positioned upstream of the last stage blade 124. The last stage blade 124 also includes a trailing edge 133 that is radially tilted relative to the leading edge 131 and in a direction of the mixed air flow 111 which is output from the compressor section 112. An inner diameter 135 at the leading edge 131 of the last stage blade 124 is aligned with a shaft cover 132 of the rotor assembly (not shown), while the inner diameter 135 at the trailing edge 133 of the last stage blade 124 is radially shifted outward from the shaft cover 132. The air flow 111 output from the compressor section 112 transitions from a longitudinally-directed flow incident on the leading edge 131 of the last stage blade 124 to a mixed air flow 111 discharged from the trailing edge 133 of the last stage blade 124 and directed into the mixed-flow diffuser 114.

Figure 5:
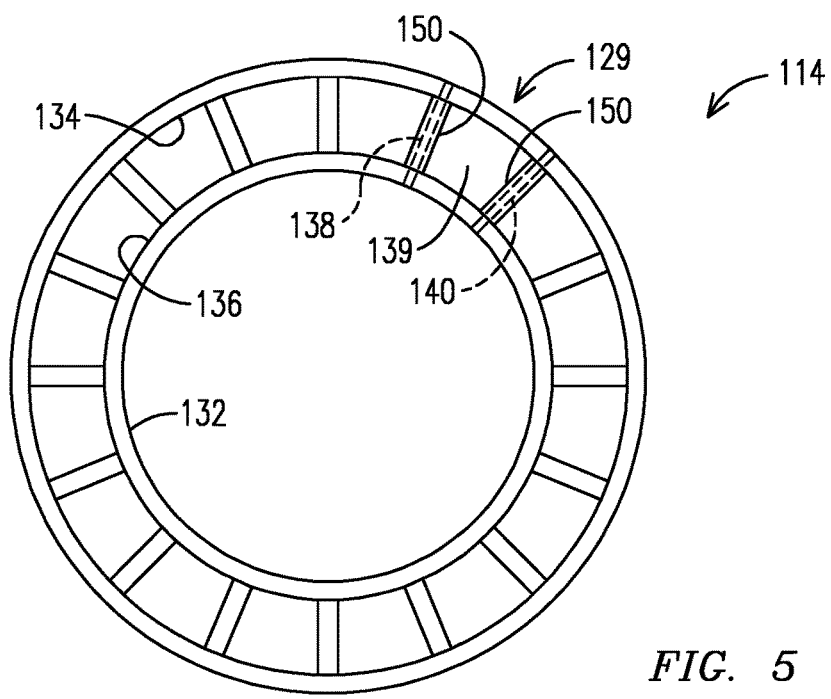
FIG. 5 is a cross-sectional longitudinal end view at a fixed longitudinal position of the mixed-flow diffuser illustrated in FIG. 4.

As illustrated in FIG. 5, the mixed flow diffuser 114 includes an inner cone 136 and an outer cone 134 that form an annulus 129 of expanding area in the mixed-flow direction, to diffuse and decelerate the expanding mixed-air flow 111 from the last stage blade 124. Unlike the inner cone 36 of the conventional axial diffuser 14, which is aligned with the shaft cover 32, the inner cone 136 of the mixed-flow diffuser 114 is radially angled outward from the shaft cover 132, so that the annulus 129 is aligned in the same direction as the mixed-air flow 111 output from the last stage blade 124. The annulus 129 is divided into discrete channels 139 by vanes 150. In order to decelerate the mixed air flow 111 in the mixed-flow direction, the diffuser 114 is designed such that the area of the discrete diffuser channels 139 increases in the downstream longitudinal direction 68 (perpendicular to the plane of the figure). Since the total area of the annulus 129 increases in the downstream longitudinal direction due to its expanding radius, the area occupied by the vanes 150 is selectively adjusted in the downstream longitudinal direction such that a desired rate of increasing area of the discrete diffuser channels 139 in the downstream longitudinal direction is achieved. In an exemplary embodiment, the vanes 150 will also provide a structural function to carry a mechanical load across the diffuser 114, and they may also receive a fastener to hold an inlet of a manifold into which the mixed-air flow 111 is directed, as discussed in greater detail below.

B. Radial Flow Initiated in the Compressor

Figure 6:
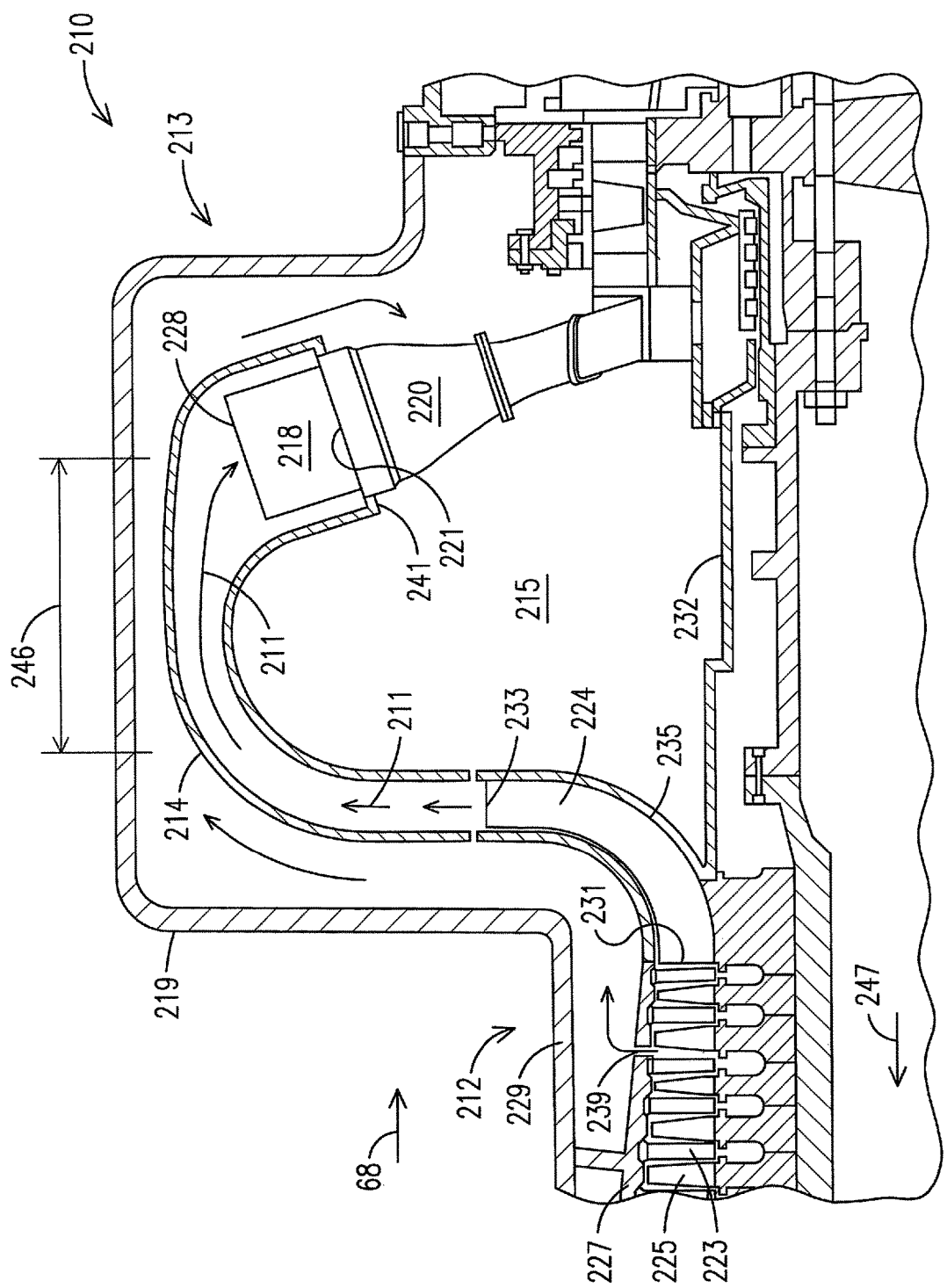
FIG. 6 is a schematic view of a compressor section with a radial outlet to a pipe diffuser within a turbine engine.

In a further improvement, a fully radial air flow may be initiated in the compressor section. FIG. 6 illustrates a midframe portion 213 of a gas turbine engine 210, including a compressor section 212. Unlike the conventional compressor section 12 discussed above, the compressor section 212 includes a last stage blade 224 that directs an air flow 211 in an outward radial direction from the compressor section 212 outlet to a region and subsequently into a respective diffuser 214. The last stage blade 224 includes a leading edge 231 that is substantially aligned with the leading edges of stationary vanes 223 and rotating blades 225 that are positioned upstream of the last stage blade 224, and a trailing edge 233 that is oriented substantially orthogonal from the leading edge 231 in a radial direction. However, the trailing edge 233 need not be oriented orthogonal from the leading edge 231, since the orientation of the trailing edge 233 need not be horizontal (as shown in FIG. 6), and the orientation of the leading edge 231 need not be vertical (as shown in FIG. 6). For a can-annular gas turbine engine, with multiple combustor heads arranged around a rotor assembly in an annular configuration, multiple diffusers are also arranged around the rotor assembly, to guide the air flow from the compressor section to the individual combustor heads. For example, if the can-annular gas turbine engine includes twelve individual combustor heads, then each diffuser has an inlet which extends along one-twelfth of the circumference of the gas turbine engine, and thus receives approximately one-twelfth of the air flow from the compressor section.

C. Mixed Flow Initiated in the Diffuser

In a further embodiment, a midframe design is provided in which a mixed air flow can be initiated within a diffuser of the midframe portion, downstream of the traditional axial compressor section. FIG. 7 illustrates a longitudinal cross-sectional view of a midframe portion 313 of a gas turbine engine 310 within a radial-tangential plane, in which a compressor section (not shown) compresses an air flow into an annulus 329 downstream of the compressor section. A plurality of diffuser ducts 314 are positioned in an annular configuration around the rotor assembly (not shown) of the gas turbine engine 310. The diffuser duct 314 receives compressed air from the annulus 329 and the diffuser duct 314 is oriented tangentially at an angle 373 which is oriented 90 degrees from the radial direction 69. Accordingly, an air flow 311 from the annulus 329 is respectively directed in a mixed flow direction into each respective diffuser duct 314, with both a radial and tangential velocity components based on the angle 373 and a longitudinal velocity component along the longitudinal direction (not shown). The diffuser duct 314 is discussed in greater detail below, and includes features which minimize the required total angle of rotation of the mixed air flow 311 as it passes from the compressor section outlet to the combustor 318, to the transition 320 and eventually to the turbine section 331 of the gas turbine engine 310. The above discussion of the diffuser duct 314 establishes that a mixed-air flow 311 can be established within the diffuser duct 314 of the midframe portion 313 of the gas turbine engine 310, in contrast with the previous embodiments, in which a mixed-air flow 111 is established within the compressor section 112 (FIG. 4) or in which a radial-air flow 211 is established within the compressor section 212 (FIG. 6).

D. Mixed Flow Initiated in a Compressor-Diffuser Combination

FIG. 8 illustrates an alternate embodiment where the radial component of a mixed-air flow 117' is initiated in a combination of the compressor section 112' and the diffuser 114', rather than exclusively in either of those sections. As illustrated in FIG. 8, the last stage blade 124 is shaped to introduce an initial radial velocity component in the air flow to output a mixed air flow 111 from the compressor section 112' into the diffuser 114'. The diffuser 114' includes an upstream portion 141' where the diffuser channel has a constant cross-sectional area in the flow direction to collimate the mixed air flow 111 received from the compressor section 112'. The diffuser 114' also includes a downstream portion 143' which receives the collimated mixed air flow from the upstream portion 141' and is shaped to introduce a secondary radial velocity component in the air flow to generate a mixed air flow 117' which has a greater radial velocity component and a reduced longitudinal velocity component than when leaving the compressor. The diffuser channel within the downstream portion 143' increases in area in the downstream direction, so that the downstream portion 143' simultaneously diffuses the air flow while introducing the second radial velocity component into the mixed air flow, to generate the mixed air flow 117'.

2. Delivery of Mixed-Flow or Radial Flow to Combustor

As discussed in the above embodiments, a mixed-air flow or a radial air flow may be initiated in any of the compressor section, the diffuser, or a combination of the compressor section and the diffuser of the midframe portion of the gas turbine engine. Once the mixed-air flow or radial air flow is initiated, the mixed-air flow or radial air flow may be delivered to the combustor head-end via any of several flow paths, as described below.

A. Chamber

Figure 1:
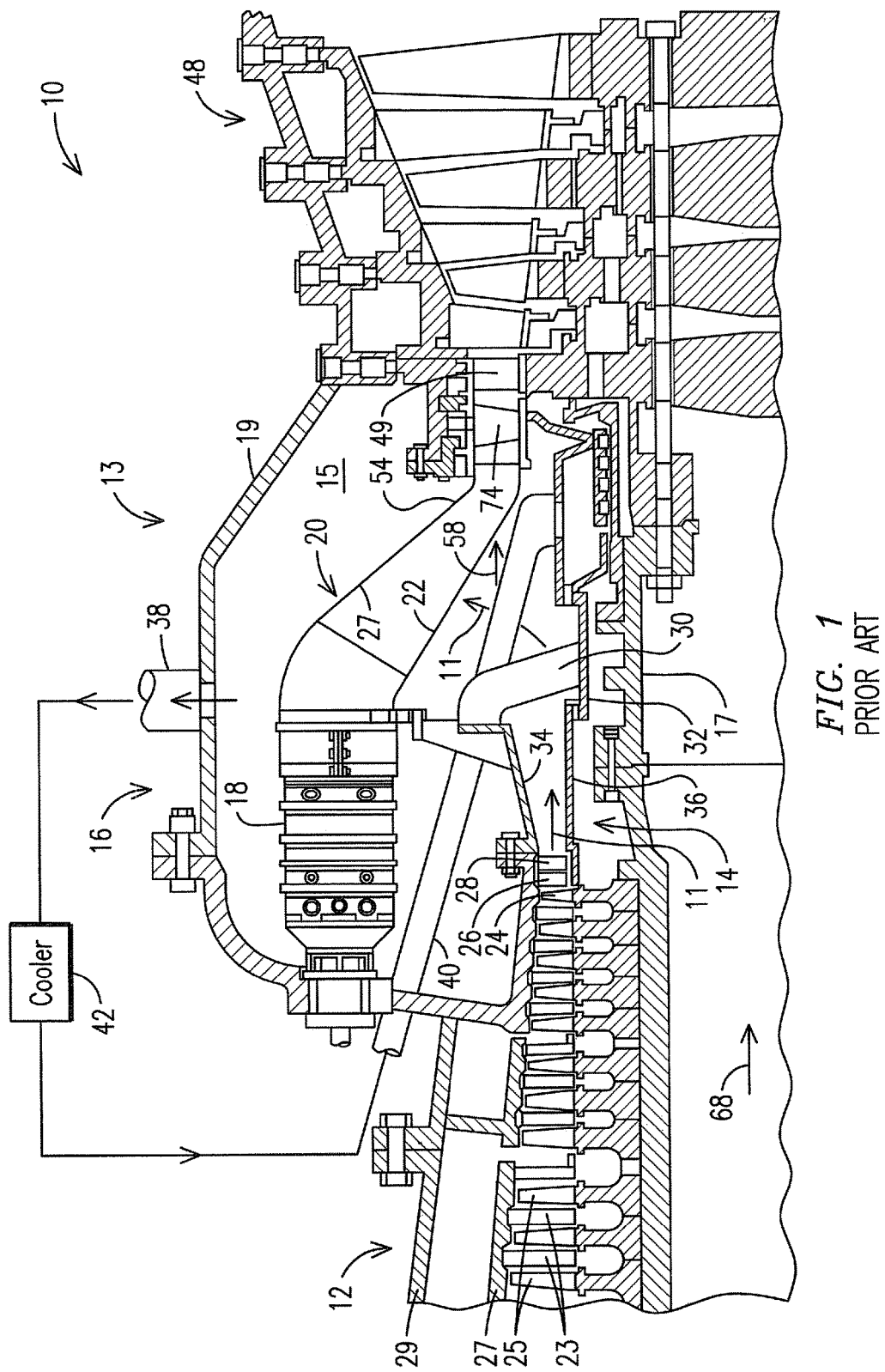
FIG. 1 is a cross-sectional view of a portion of a conventional turbine engine.
Figure 2:
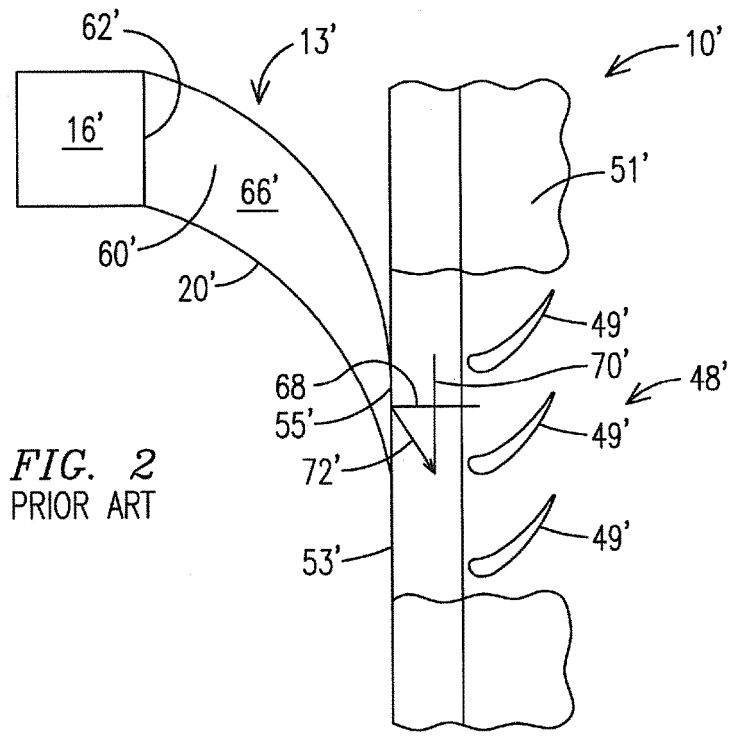
FIG. 2 is a cross-sectional view of a trans-vane design of a transition of a conventional turbine engine.

As previously discussed, the conventional midframe portion 13 of the gas turbine 10 in FIG. 1 features an axial diffuser 14 which discharges the air flow 11 into the chamber 15, after which the air flow 11 experiences aerodynamic loss in the process of randomly entering one of the multiple combustor heads 18. A gas turbine engine having a radial or mixed flow output from the compressor/diffuser may similarly discharge into the chamber. Although discharging the air flow into the chamber would introduce pressure and aerodynamic loss as the air flow 111 travels within the chamber to one of the combustor heads 118, the arrangement would nevertheless involve reduced pressure and aerodynamic losses than the conventional arrangement because the air would undergo less turning. As previously discussed, the air flow 11 discharged from the axial diffuser 14 of the conventional midframe portion 13 undergoes a first 180 degree rotation from an upstream longitudinal direction to a downstream longitudinal direction, to travel to one of the combustor heads 18. In contrast, the last stage blade 124 and the diffuser 114 of the midframe portion 113 introduce a radial velocity component into the mixed-air flow 111, and thus the mixed-air flow 111 need not undergo the 180 degree rotation to be oriented in the downstream longitudinal direction. Additionally, the air flow travels an outward radial distance to the combustor head, and since the mixed-air flow 111 includes a radial velocity component, the mixed-air flow 111 will have a reduced transit time to one of the combustor heads 118, as compared to the air flow in the conventional midframe portion 13 without a radial velocity component. Additionally, since the diffuser 114 outlet is radially shifted outward as compared to the diffuser outlet of the conventional midframe portion 13, the mixed-air flow 111 has a reduced transit distance to one of the combustor heads 118, as compared to the air flow in the conventional midframe portion 13. Accordingly, in an embodiment in which the mixed-air flow 111 is discharged into the chamber, the mixed-air flow 111 experiences a reduced aerodynamic loss than a conventional air flow in the process of entering one of the combustor heads within the chamber.

B. Diffuser-Combustor Coupling

In order to reduce the aerodynamic losses associated with discharging the mixed air flow or radial flow from the compressor section into the chamber, the mixed air flow or radial air flow could be directly coupled from individual portions of the compressor-diffuser outlet to a respective combustor head inlet, thereby bypassing the chamber in which the aerodynamic loss associated with the random entry into one of the multiple combustor heads occurs in the conventional arrangement. Various embodiments of this concept are described in the following paragraphs.

(a) Diffuser-Manifold Combination

As illustrated in FIG. 4, the midframe portion 113 of the gas turbine engine 110 includes the diffuser 114 that partially extends from the outlet 182 of the compressor section 112 to the respective combustor head 118. An inlet 184 of manifold 121 is coupled to an outlet 186 of the diffuser 114 at one end and to an inlet 188 of the respective combustor head 118 at the other end, to facilitate passage of the mixed-air flow 111 from the diffuser 114 to the respective combustor head 118. As illustrated in FIG. 5, the outlet of respective arcuate portions of the compressor section 112 passes to an annulus 129 which is separated into respective channels 139 by the vanes 150 of the diffuser 114, with each channel 139 leading to a respective combustor head 118. The inner and outer cones 136,134 as well as the vanes 150 of the diffuser 114 are designed such that the area of the channel 139 expands in the downstream direction so that the mixed-air flow 111 expands and decelerates. As previously discussed, the vanes 150 may be sufficiently thick to be capable of receiving a fastener to secure an inlet of the manifold 121 around a perimeter of the channel 139 at an outlet of the diffuser 114. Additionally, as discussed below, the vanes 150 may receive one or more rotor cooling extraction pipes 138 and one or more rotor cooling injection pipes 140. Also, the rate of diffusion and total diffusion in each channel 139 may be the same or may be individually selected for each channel. Furthermore, the mixed-air flow 111 may be evenly distributed between the channels 139 or may be unevenly distributed.

As previously discussed, the conventional midframe portion 13 of the gas turbine engine 10 provides a strut 30 to support a shaft cover 32 of the rotor assembly 17 at the casing 19 of the combustion section 16. The strut 30 is attached from the shaft cover 32 to the outer cone 34 of the axial diffuser 14, and thus the casing 19 of the combustion section 16 supports the strut 30 at the shaft cover 32. As illustrated in FIGS. 4 and 5, the diffuser 114 includes the inner cone 136 that is radially shifted outward from the shaft cover 132, to align the channel 139 of the diffuser 114 to receive the mixed-air flow 111. Regarding the transfer of the load of the casing (not shown) to the shaft cover 132, the load is first transferred from the casing to the outer cone 134 (secured to the casing) of the diffuser 114, and is subsequently transferred to the inner cone 136 of the diffuser by the vanes 150 within the diffuser 114. The load is then subsequently transferred from the inner cone 136 of the diffuser 114 to the shaft cover 132 by the strut 130 which is attached to the inner cone 136. Since the strut 130 is attached to the inner cone 136 of the diffuser 114, the strut 130 does not affect the compressed air flow 111 exiting from the outlet of the mixed-flow diffuser 114, and thus does not affect the aerodynamic efficiency of the air flow 111 passing from the compressor section 112 to a respective combustor head 118 in the midframe portion 113.

As previously discussed, the rotor-cooling extraction pipe 38 of FIG. 1 is provided in the conventional midframe portion 13, to extract compressed air from the chamber 15 and pass the compressed air into the cooler 42. The cooled air subsequently passes from the cooler 42 through the rotor-cooling injection pipe 40 that is positioned within the chamber 15 and directs the cooled air below the shaft cover 32, to cool the rotor and supply cooling air to the first stage blade 49 of the turbine 48. The midframe portion 113 of FIG. 4 directly couples the mixed-air flow 111 from the compressor section 112 outlet to a respective combustor head 118 inlet, and thus the mixed-air flow 111 bypasses the chamber, resulting in a reduced amount of air flow within the chamber, as compared to the midframe portion 13 of FIG. 1. Accordingly, as illustrated in FIG. 5, the rotor cooling extraction pipe 138 is repositioned to within the vanes 150 of the diffuser 114, to draw compressed air from the chamber (not shown), and pass the compressed air to the cooler (not shown). Additionally, the rotor cooling injection pipe 140 is similarly repositioned to pass the cooled air from the cooler (not shown) through the vanes 150 to the shaft cover 132, to cool the rotor and the first stage blade (not shown) of the turbine section. Thus, embodiments of the present invention avoid aerodynamic loss resulting from the compressed air passing over the pipes 138, 140.

Although FIG. 4 illustrates a last stage blade 124 which introduces a radial velocity component into the mixed-air flow 111, and FIG. 8 illustrates a last stage blade 124' and a diffuser downstream portion 143' which introduce a radial velocity component into the mixed-air flow 111, various optional configurations that initiate a mixed-air flow in the midframe portion of the gas turbine engine can be used. For example, a conventional last stage blade 24 (FIG. 1) could be used within the midframe portion, in addition to a vaneless turning section downstream of the last stage blade 24, which introduces a radial velocity component into the mixed-air flow, upstream of the diffuser. In another example, a conventional last stage blade 24 (FIG. 1) could be used within the midframe portion, in addition to a last stage vane having a similar curvature as the last stage blade 124 of FIG. 4, to similarly introduce a radial velocity component into the mixed-air flow, upstream of the diffuser.

As previously discussed, the diffuser 114 of FIG. 4 extends a portion of the way from the outlet 182 of compressor section 112 outlet to the respective combustor head 118 by way of manifold 121 that couples the outlet 186 of diffuser 114 to the inlet 184 of manifold 121, which is fluidly coupled to combustor head 118. In an exemplary embodiment, the manifold 121 may be a secondary diffuser. For example, the inlet 188 of the combustor head 118 may feature an incoming velocity threshold which cannot be exceeded by the mixed-air flow 111 incident to the inlet 188 of the combustor head 118. Thus, the manifold 121 may be a secondary diffuser, to further diffuse and decelerate the mixed-air flow 111 prior to the inlet 188 of the combustor head 118, such that a velocity of the mixed-air flow 111 is reduced from an initial velocity that exceeds a velocity threshold of the inlet 188 of combustor head 118 to a final velocity that is less than the velocity threshold of the inlet 188 of combustor head 118. In an exemplary embodiment, to enhance the effectiveness of the manifold 121 as a secondary diffuser of the mixed-air flow 111, the manifold 121 may include flow condition devices within an interior channel of the manifold 121, to enhance a diffusion of the mixed-air flow 111, such as a wedge positioned along a longitudinal inner surface of the manifold 121, for example.

The interface between the diffuser 114 outlet and the manifold 121 inlet, as well as the interface between the manifold 121 outlet and the combustor head 118 inlet each feature negligible or no pressure difference between the manifold 121 and the chamber (not shown), to provide a controlled amount of air leakage across the diffuser-manifold interface and the manifold-combustor head interface. This controlled amount of air leakage between the diffuser-manifold interface and the manifold-combustor head interface increases an air flow within the chamber (not shown), which in-turn circulates hot, stagnant air within the chamber. Such an arrangement could be used in an embodiment of FIG. 4 with a rotor cooling extraction pipe (not shown) similar to the pipe 38 of FIG. 1, so that the increased air flow within the chamber based on the controlled leakage at the interfaces would increase the air flow that passes out of the chamber through the rotor cooling extraction pipe. As illustrated in FIG. 1, the conventional rotor cooling extraction pipe 38 draws air from the chamber 15 and may include more than one extraction pipe that may limit the amount of air flow within the chamber 15 that can enter the combustor heads 18. However, an embodiment of FIG. 4 with a rotor cooling extraction pipe similar to the pipe 38 of FIG. 1 provides a direct coupling between a respective diffuser 114 outlet and a respective combustor head 118 inlet, and thus the amount of air entering the combustor head 118 inlets would not be limited by the air flow extracted from the chamber through the rotor cooling extraction pipe.

In an exemplary embodiment, an inner diameter of the manifold 121 inlet is greater than an outer diameter of the diffuser 114 outlet. Additionally, in an exemplary embodiment, an inner diameter of the manifold 121 outlet is greater than an outer diameter of the respective combustor head 118 inlet. As appreciated by one of skill in the art, both the diffuser 114 outlet and the combustor head 118 inlet are positioned within the manifold 121 inner diameter, to maximize the volume of the mixed-air flow 111 that is coupled from the diffuser 114 outlet to the respective combustor head 118 inlet through the manifold 121. The manifold 121 inlet and manifold 121 outlet may be respectively attached to the diffuser 114 outlet and the respective combustor head 118 inlet using any of a number of conventional fasteners or fastening techniques known to one of skill in the art. The manifold 121 is specifically designed, based on the specific parameters of each midframe portion 113 including one or more of the diffuser 114, each respective combustor head 118, and a dimension of the chamber (not shown), such that during an operation of the midframe portion 113 in which the mixed-air flow 111 is coupled through the manifold 121, the manifold 121 does not vibrate at a frequency which corresponds with a resonance frequency of the chamber.

(b) Integrated Diffuser

In addition to the partial diffuser discussed above which partially extends between the compressor section outlet and a respective combustor head, the embodiments of the present invention also include an integrated diffuser which fully extends between the compressor section outlet and the respective combustor head. More than one type of integrated diffuser are presented, such as an integrated diffuser which is designed to enhance a cost efficiency of manufacturing the midframe portion of the gas turbine engine (FIG. 6) and an integrated diffuser which is designed to enhance an aerodynamic efficiency of the midframe portion of the gas turbine engine (FIGS. 7,9).

(c) Straight Integrated Diffuser Duct

Figure 3:
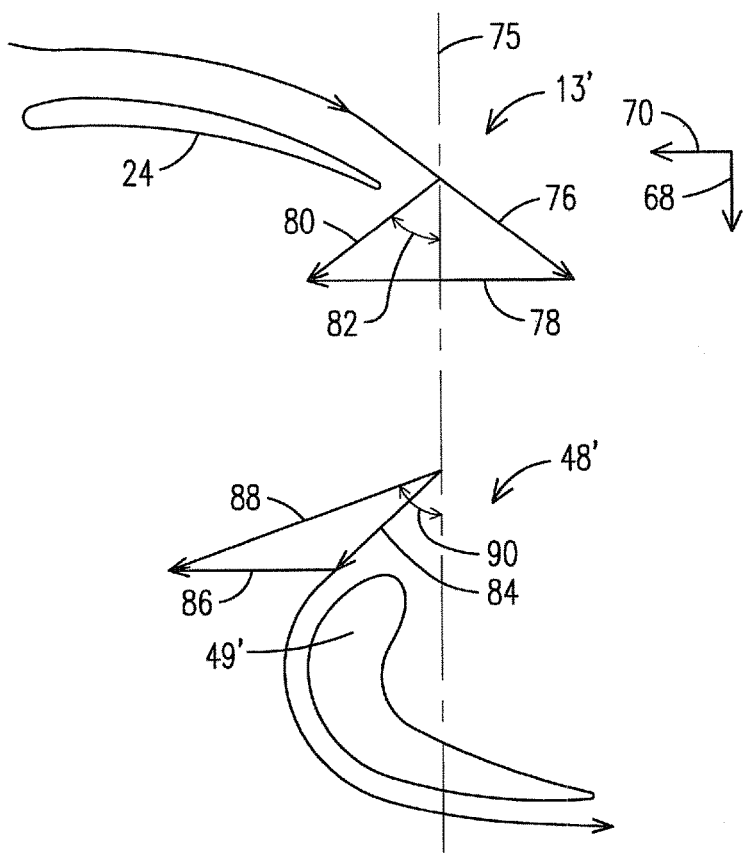
FIG. 3 is a radial view of a last compressor blade and a first turbine blade of the conventional turbine engine of FIG. 2.
Figure 9:
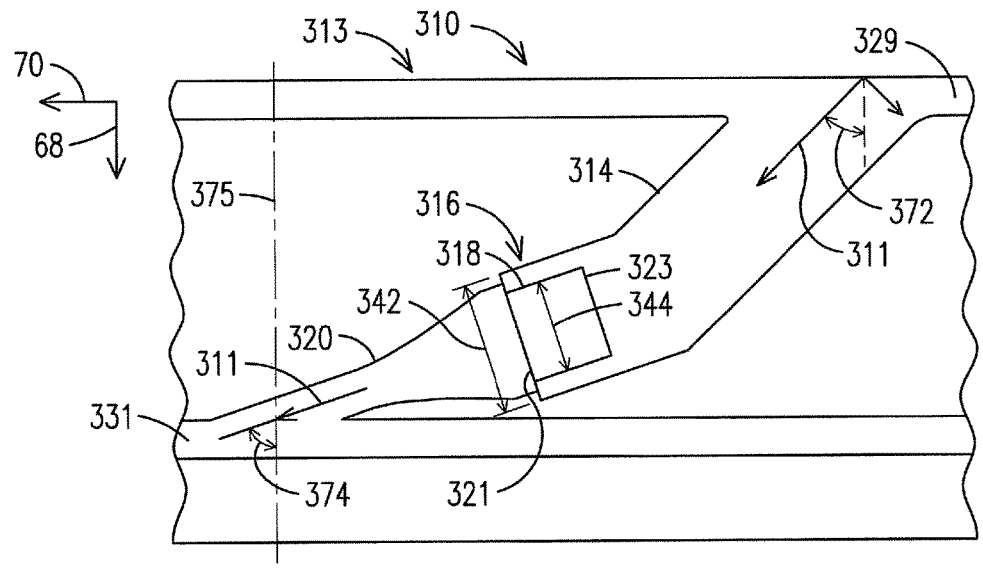
FIG. 9 is a partial radial view of the linear diffuser duct illustrated in FIG. 7.

FIG. 9 illustrates a radial view of the diffuser duct 314 of FIG. 7, in the longitudinal-tangential plane, where the diffuser duct 314 extends from the annulus 329 at the compressor section outlet, to the respective combustor head 318 inlet of the combustor 316. Thus, the diffuser duct 314 is in contrast with the diffuser 114 of FIG. 4, which partially extends from the compressor section 112 outlet to the respective combustor head 118 inlet. The last stage blade (not shown) of the compressor section in the midframe portion 313 of FIG. 9 is similar to the last stage blade 24 of the midframe portion 13' illustrated in FIG. 3, and thus the air flow 311 comes off the last stage blade (not shown) of the midframe portion 313 with an absolute outgoing velocity vector oriented at an angle 372 in the tangential direction 70 with respect to the longitudinal direction 68. In an exemplary embodiment, the angle 372 is approximately 45 degrees. To accommodate the absolute outgoing velocity vector oriented at the angle 372, the diffuser duct 314 is a straight duct that is also angled at the angle 372, to receive the air flow 311. Also, the first stage blade (not shown) of the turbine in the midframe portion 313 of FIG. 9 is similar to the first stage blade 49' of the midframe portion 13' illustrated in FIG. 3, and thus the air flow 311 is incident on the first stage blade 49' with an absolute incoming velocity vector oriented at an angle 374 in the tangential direction 70 with respect to the longitudinal direction 68. In an exemplary embodiment, the angle 374 is approximately 70 degrees. To accommodate the absolute incoming velocity vector oriented at the angle 374, a trans-vane transition 320 is a straight duct that is also angled at the angle 374, to receive the air flow 311 from the combustor head 318 at the angle 374. Thus, the air flow 311 experiences an offset in the absolute velocity vector from the angle 372 to the angle 374 at the combustor head 318. Although the angular offset from the angle 372 to the angle 374 occurs at the combustor head 318, the angular offset is relatively small, such as 25 degrees, for example, in comparison with the total angle of rotation of the air flow from the compressor outlet to the combustor head inlet in a conventional midframe portion, such as 400 degrees, for example. As illustrated in FIG. 9, the diffuser duct 314 is designed to accommodate an air flow from an annulus 329 through a straight tubular duct and to an outlet, while the transition 320 is designed with a reverse design to the diffuser duct 314, as it accommodates an air flow from an inlet through a straight tubular duct and to an annulus 331 within the turbine section. As illustrated in FIG. 7, an injector 325 is positioned to pass a volume of fuel 327 into the combustor head 318, which is mixed with the air flow 311 and the air-fuel mixture is subsequently ignited. As illustrated in FIG. 9, an outlet of the diffuser duct 314 encloses the inlet of the combustor head 318 inlet, since the outer diameter 342 of the diffuser duct 314 outlet is greater than the outer diameter 344 of the combustor head 318 inlet.

In addition to the angular offset of the air flow 311 traveling within the longitudinal-tangential plane (FIG. 9) of the midframe portion 313, the air flow 311 experiences an angular offset in the radial-tangential plane of the midframe portion 313, and both of these angular offsets are combined to determine the total angle of rotation of the air flow 311 while passing from the compressor outlet to the respective combustor head 318 inlet. FIG. 7 illustrates the midframe portion 313, within the radial-tangential plane, in which the air flow 311 passes from the annulus 329 at the compressor outlet (not shown) in the tangential direction 70 orientated at an angle 373 of 90 degrees with respect to the radial direction 69. The air flow 311 passes within the diffuser duct 314, that is similarly angled in the radial-tangential plane at the angle 373, and enters the combustor head 318 inlet in a mixed-flow direction with combined radial and tangential velocity components. The air flow 311 emerges from the combustor head 318 inlet in a mixed-flow direction with combined radial and tangential velocity components at an angle 375 and passes within the transition 320, that is similarly angled in the radial-tangential plane at the angle 375. The air flow 311 subsequently exits the transition 320 at an annulus 331 in a tangential direction that is oriented at the angle 375 which is 90 degrees with respect to the radial direction 69 at the transition 320 exit. Upon entering the annulus 331, the air flow 311 is directed at the first stage blades of the turbine (not shown), at the appropriate angle 374 in the longitudinal-tangential plane (FIG. 9). The angular offset of the air flow 311 in the radial-tangential plane is based on such factors as the radial height of the compressor section outlet, the radial height of the combustor head 318 and the radial height of the turbine inlet. For purposes of FIG. 7, it is presumed that the height of the last stage blade of the compressor section is less than the height of the first stage blade of the turbine within the casing 319, and thus the air flow 311 enters the diffuser duct 314 at a reduced radial height than the air flow 311 exits the transition 320. In an exemplary embodiment, the angle 373 may be 90 degrees, while the angle 375 may be 90 degrees, and thus the air flow 311 would undergo a 90 degree rotation in the radial-tangential plane, while traveling from the compressor outlet and into the combustor head 318 inlet.

As previously discussed, the integrated diffuser duct 314 provides a substantial reduction in the total angle of rotation of the air flow 311, as the air flow 311 passes from the compressor outlet to the combustor head 318 inlet. The total angle of rotation of the air flow 311 includes the angle of rotation of the air flow 311 within the longitudinal-tangential plane (FIG. 9) and the angle of rotation of the air flow 311 within the radial-tangential plane (FIG. 7). As discussed above, in an exemplary embodiment, the angle of rotation of the air flow 311 within the longitudinal-tangential plane (FIG. 9) may be approximately 25 degrees, for example. Also, as discussed above, in an exemplary embodiment, the angle of rotation of the air flow 311 within the radial-tangential plane (FIG. 7) may be approximately 90 degrees, for example. Thus, as a result of using the integrated diffuser duct 314, the total angle of rotation for the air flow 311 passing from the compressor outlet to the combustor head 318 inlet is approximately 115 degrees. This total angle of rotation is substantially less than the approximate 400 degree total angle of rotation of the air flow passing from the compressor outlet to the combustor head inlet in a conventional midframe portion of the gas turbine engine. Indeed, the diffuser duct 314 enhances the aerodynamic efficiency of the midframe portion 313 of the gas turbine engine 310.

Figure 10:
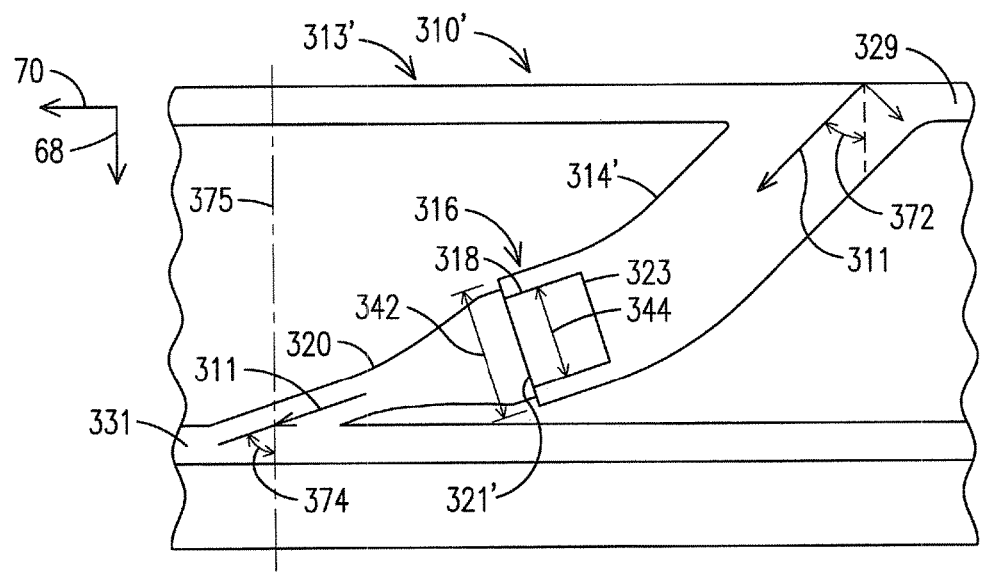
FIG. 10 is a partial radial view of an arcuate diffuser duct within a turbine engine.
Figure 11:
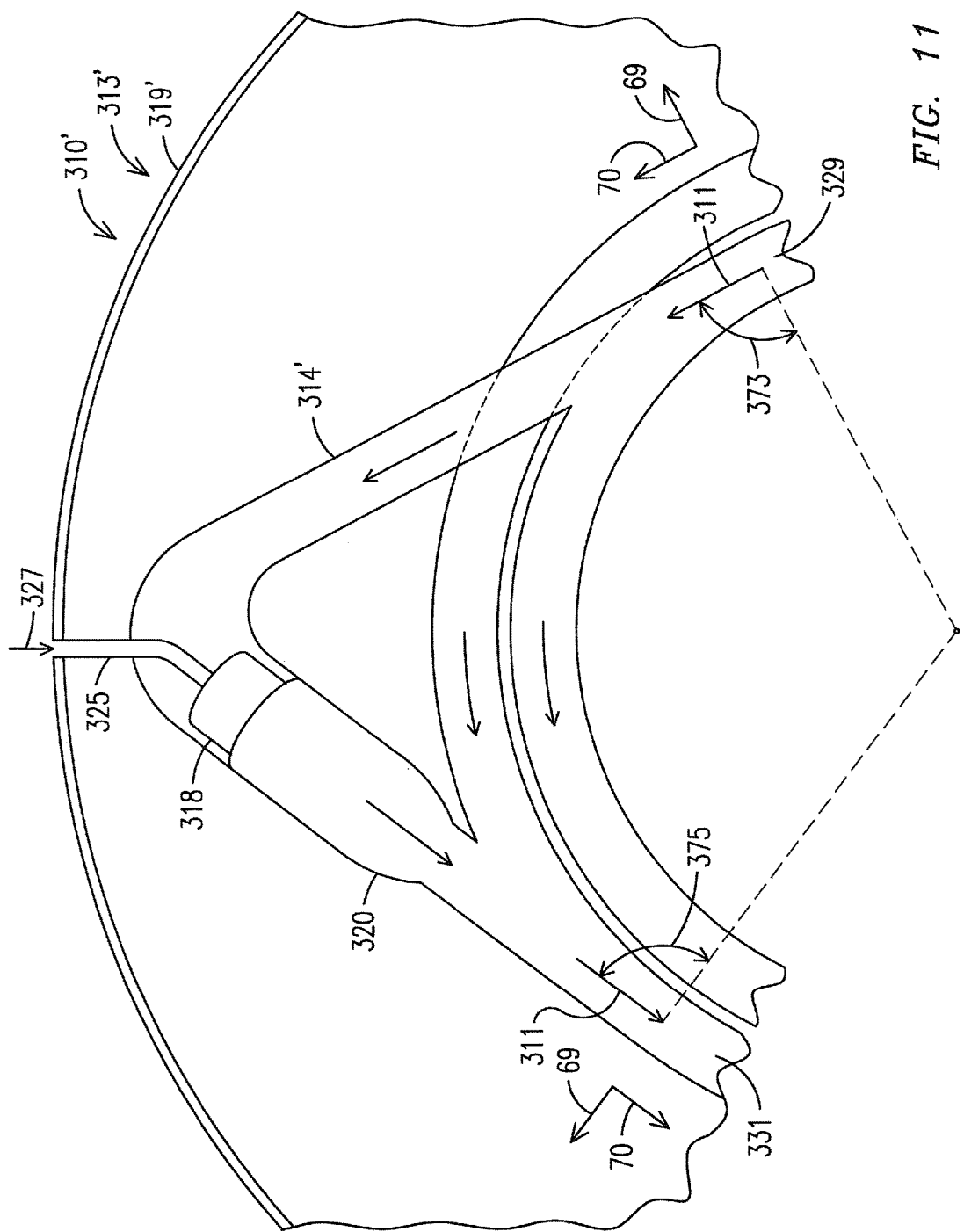
FIG. 11 is a partial longitudinal view of the arcuate diffuser duct illustrated in FIG. 10.

(d) Curved Diffuser Duct (1) Integrated Diffuser to Enhance Aerodynamic Efficiency FIGS. 10-11 illustrate an alternate embodiment of the midframe portion 313' of the gas turbine engine 310', which is similar to the midframe portion 313 of FIGS. 7 and 9, with the exception that the diffuser duct 314' has an alternate design than the diffuser duct 314 of FIGS. 7 and 9. As previously discussed, the diffuser duct 314 of FIGS. 7 and 9 features a straight tubular configuration, which directs the air flow 311 to the combustor head 318 inlet at the angle 372 in the tangential direction 70 relative to the longitudinal direction 68, after which the air flow 311 undergoes an angular offset at the combustor head 318 inlet to the angle 374 in the tangential direction 70 relative to the longitudinal direction 68, before passing through to the transition 320. Thus, the angular offset of the air flow 311 from the angle 372 to the angle 374 occurs at the combustor head 318 inlet. In contrast with the diffuser duct 314 of FIGS. 7 and 9, the diffuser duct 314' of FIGS. 10-11 takes an helical shape rather than a straight tubular configuration, where the inlet of the diffuser duct 314' at the annulus 329 is aligned at the angle 372 in the tangential direction 70 relative to the longitudinal direction 68, while the outlet of the diffuser duct 314' at the combustor head 318 inlet is aligned at the angle 374 in the tangential direction 70 relative to the longitudinal direction 68. Thus, the angular offset of the air flow 311 from the angle 372 to the angle 374 occurs over the length of the helical shape of the diffuser duct 314' between the inlet at the annulus 329 and the outlet at the combustor head 318 inlet. Since the required angular offset from the angle 372 to the angle 374 occurs over the length of the diffuser duct 314', the angular offset need not occur at the combustor head 318 inlet. Accordingly, the air flow 311 passing from the outlet of the diffuser duct 314' into the combustor head 318 inlet experiences minimal angular offset. The outlet of the diffuser duct 314' in FIGS. 10-11 is attached to the combustor head 318 inlet such that the face 321' of the diffuser duct 314' outlet is aligned parallel with the face 323 of the combustor head 318 inlet. As with the midframe portion 313 illustrated in FIGS. 7 and 9, the outer diameter 342 of the diffuser duct 314' outlet is greater than the outer diameter 344 of the combustor head 318 inlet, such that the diffuser duct 314' outlet encloses the combustor head 318 inlet. As illustrated in FIG. 11, since the diffuser duct 314' takes a helical shape in the radial-tangential plane, the diffuser duct 314' may rise to a peak radial height that is greater than a peak radial height of the diffuser duct 314 with the straight tubular configuration illustrated in FIG. 7. Thus, in order to accommodate the greater peak radial height of the diffuser duct 314', the midframe portion 313' may feature a larger casing 319' than the casing 319 of FIG. 7, such that the diffuser duct 314' has adequate radial space within the casing 319' to pass the mixed-air flow 311 from the compressor outlet to the combustor head 318 inlet. Based on the larger casing 319' of the midframe portion 313' and the smaller casing 319 of the midframe portion 313, the manufacturing cost efficiency for the midframe portion 313 may be greater than the midframe portion 313'. However, as previously discussed, the diffuser duct 314 takes on a straight tubular form which directs the angular offset from the angle 372 to the angle 374 at the outlet of the diffuser duct 314, while the diffuser duct 314' takes on a helical form which directs the angular offset from the angle 372 to the angle 374 along the length of the diffuser duct 314', and thus the aerodynamic efficiency of the midframe portion 313' may be greater than the midframe portion 313.

Figure 12:
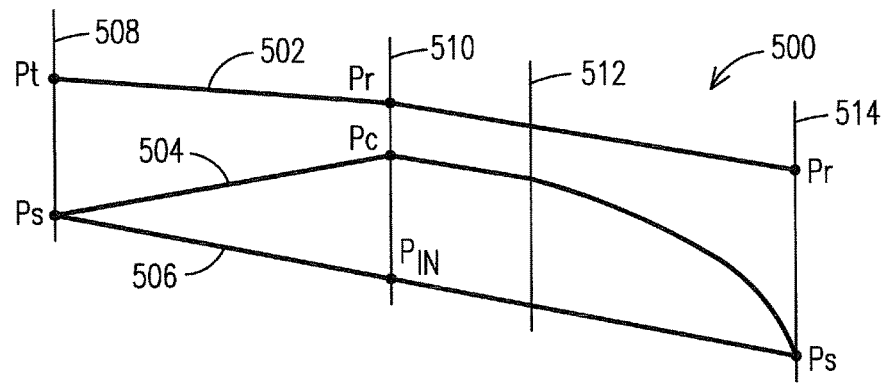
FIG. 12 is a plot of total pressure and static pressure of an air flow versus a longitudinal location of the air flow along a gas turbine engine.

The integrated diffuser duct embodiments of FIGS. 7, 9 and 10-11 are used to reduce a dynamic pressure of the air flow and simultaneously increase a static pressure of the air flow, as the air flow passes through the diffuser duct. FIG. 12 illustrates a graph of the total pressure 502 and the static pressure 504 of the air flow 311 within the diffuser duct of FIGS. 7 and 9, as well as an intermediate pressure 506 outside the diffuser duct in the casing 319. As appreciated by one of skill in the art, the total pressure 502 of an air flow is the sum of the static pressure 504 of the air flow and a dynamic pressure of the air flow. Thus, the dynamic pressure of the air flow 311 can be determined by the difference between the total pressure 502 and the static pressure 504 of the air flow 311. FIG. 12 depicts the various pressures at different locations throughout the midframe portion 313 of the gas turbine engine 310, including the last stage blade of the compressor 508, the combustor head inlet 510, the combustor head outlet 512, and the trans-vane transition outlet 514. As illustrated in FIG. 12, as the air flow 311 passes through the diffuser duct 314 between the compressor last stage blade 508 and the combustor head inlet 510, the air flow 311 decelerates, thereby reducing the dynamic pressure, and thus increasing the static pressure 504. The diffuser duct 314 gradually reduces the dynamic pressure of the air flow 311, and thus effectively converts most or all of the dynamic pressure of the air flow 311 into static pressure 504. In contrast, the conventional midframe portion 13 of FIG. 1 discharges the air flow 11 into the chamber 15, where the air flow 11 suddenly loses a large amount of dynamic pressure which may not be converted back to dynamic pressure and thus is lost in the process of discharging the air flow 11 into the chamber 15. Upon entering the combustor head inlet 510, the fuel-air mixture in the combustor head 318 is ignited, which accelerates the air flow 311 through the combustor outlet 512 and through the outlet of the transition 514, thereby increasing the dynamic pressure, and thus decreasing the static pressure 504. Throughout the operation of the midframe portion 313, a pressure within the casing 319 is set at the intermediate pressure 506, which is less than the static pressure 504 at each location throughout the midframe portion 313. As appreciated by one of skill in the art, stagnant air may collect at the interfaces between the diffuser duct 314 and the combustor head 318, and the combustor head 318 and the transition 320. By adjusting the intermediate pressure 506 within the casing 319 to be less than the static pressure 504 of the air flow 311 within the diffuser duct 314, the combustor head 318 or the transition 320, a leakage of air flow will pass across these interfaces, to discharge any stagnant air within the interfaces, and thus prevent hot, stagnant air from building up at these interfaces.

Figure 13:
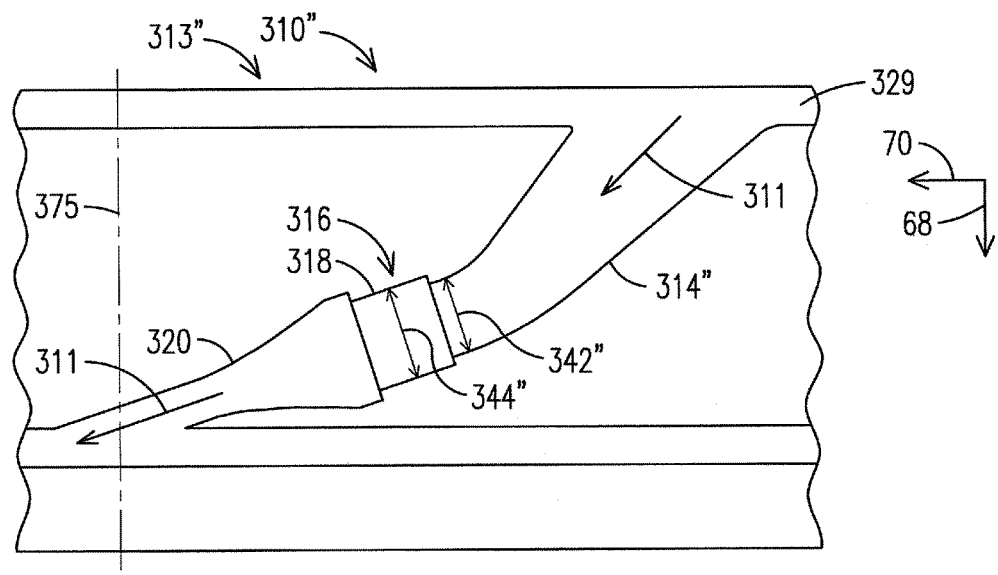
FIG. 13 is a partial radial view of an arcuate duct within a turbine engine.
Figure 14:
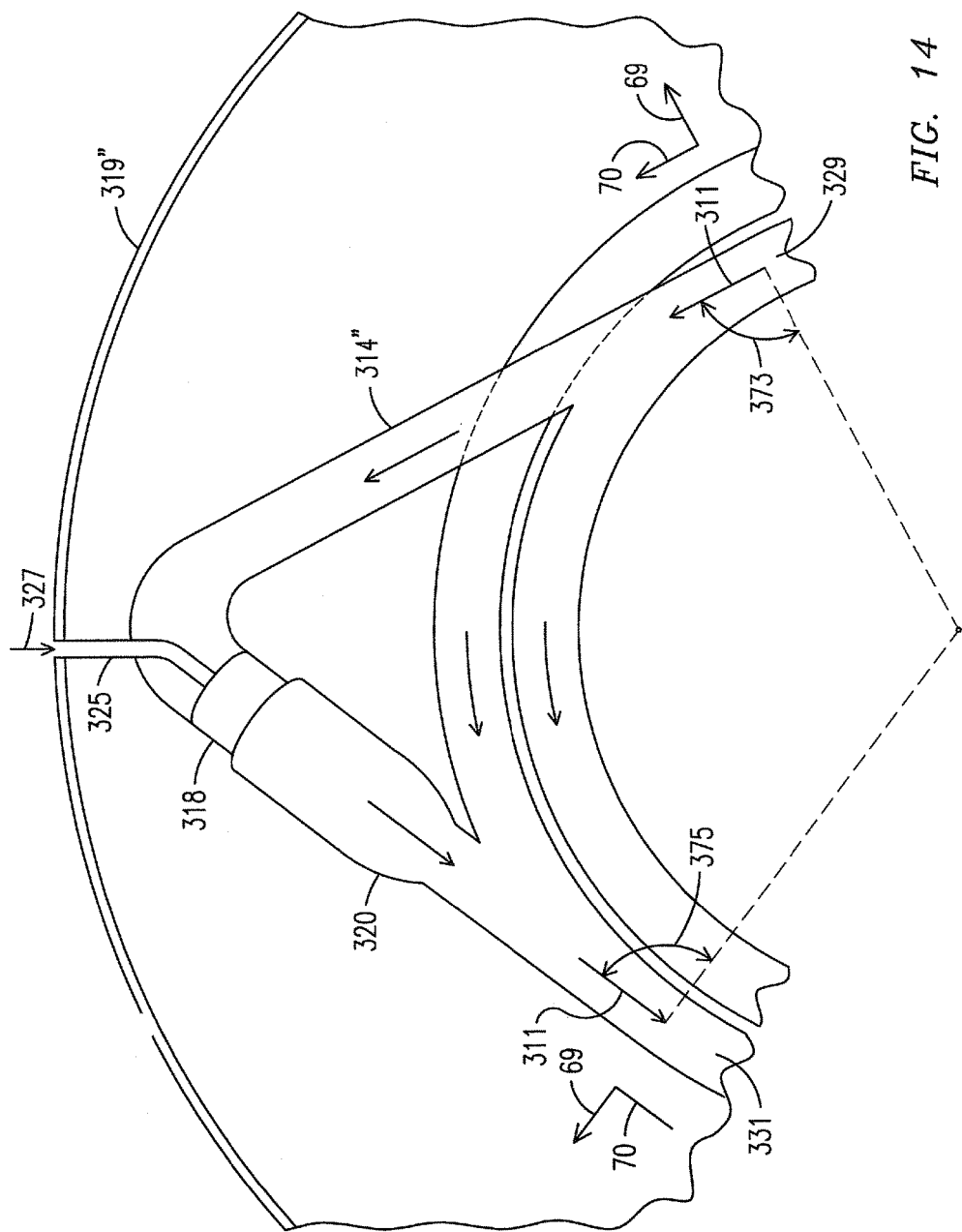
FIG. 14 is a partial longitudinal view of the arcuate duct illustrated in FIG. 13.

FIGS. 13-14 illustrate an alternate embodiment of the midframe portion 313" of the gas turbine engine 310", which is similar to the midframe portion 313' of the gas turbine engine 310' depicted in FIGS. 10-11, with the mixed-air flow 311 being passed through a manifold 314", which does not act as a diffuser, but instead accelerates a velocity of the mixed-air flow 311 from the annulus 329 at the compressor outlet to the combustor head 318 inlet. Unlike the diffuser duct 314' of FIGS. 10-11, the outer diameter 342" of the manifold 314" is less than the outer diameter 344" of the combustor head 318 inlet, such that the manifold 314" outlet is positioned within the inlet of the combustor head 318 inlet. In contrast, in the above embodiments of FIGS. 7, 9 and 10-11, the outer diameter 342 of the diffuser duct is greater than the outer diameter 344 of the combustor head 318 inlet, so that the diffuser duct outlet encloses the combustor head 318 inlet. As with the midframe portions 313, 313' of FIGS. 7 and 11, the midframe portion 313" of FIG. 13 includes an injector 325 to pass a volume of fuel 327 into the combustor head 318. The fuel 327 may be a reactive fuel, such as hydrogen, for example, which exhibits high flame speeds, and thus requires a high incoming velocity of the mixed-air flow 311 into the combustor head 318 to avoid flashback. By sizing the outer diameter 342" of the manifold 314" to be less than the outer diameter 344" of the combustor head 318 inlet, and positioning the manifold 314" outlet within the combustor head 318 inlet, the velocity of the mixed-air flow 311 into the combustor head 318 inlet is increased, to the high incoming velocity threshold of the combustor head 318, to avoid flashback when reactive fuel 327 is passed into the combustor head 318 through the injector 325.

(2) Integrated Diffuser to Enhance Cost Efficiency

The blades 225 and the last stage blade 224 of the compressor section 212 in FIG. 6 are shifted in an upstream direction 247, to minimize a gap between an outer diameter of the last stage blade 224 and a cylinder 227 that encloses the alternating rows of blades 225 and vanes 223. By minimizing this gap, the power efficiency of the last stage blade 224 is enhanced, to replace more than one stage of the compressor section 212 without a loss of total power. Thus, the last stage blade 224 is provided to reduce the number of vanes 223 and blades 225 in each stage of the compressor section 212, and/or the length of the compressor section 212 in the longitudinal direction 68, thereby enhancing the cost efficiency of manufacturing the midframe portion 213 of the gas turbine engine 210.

Figure 15:
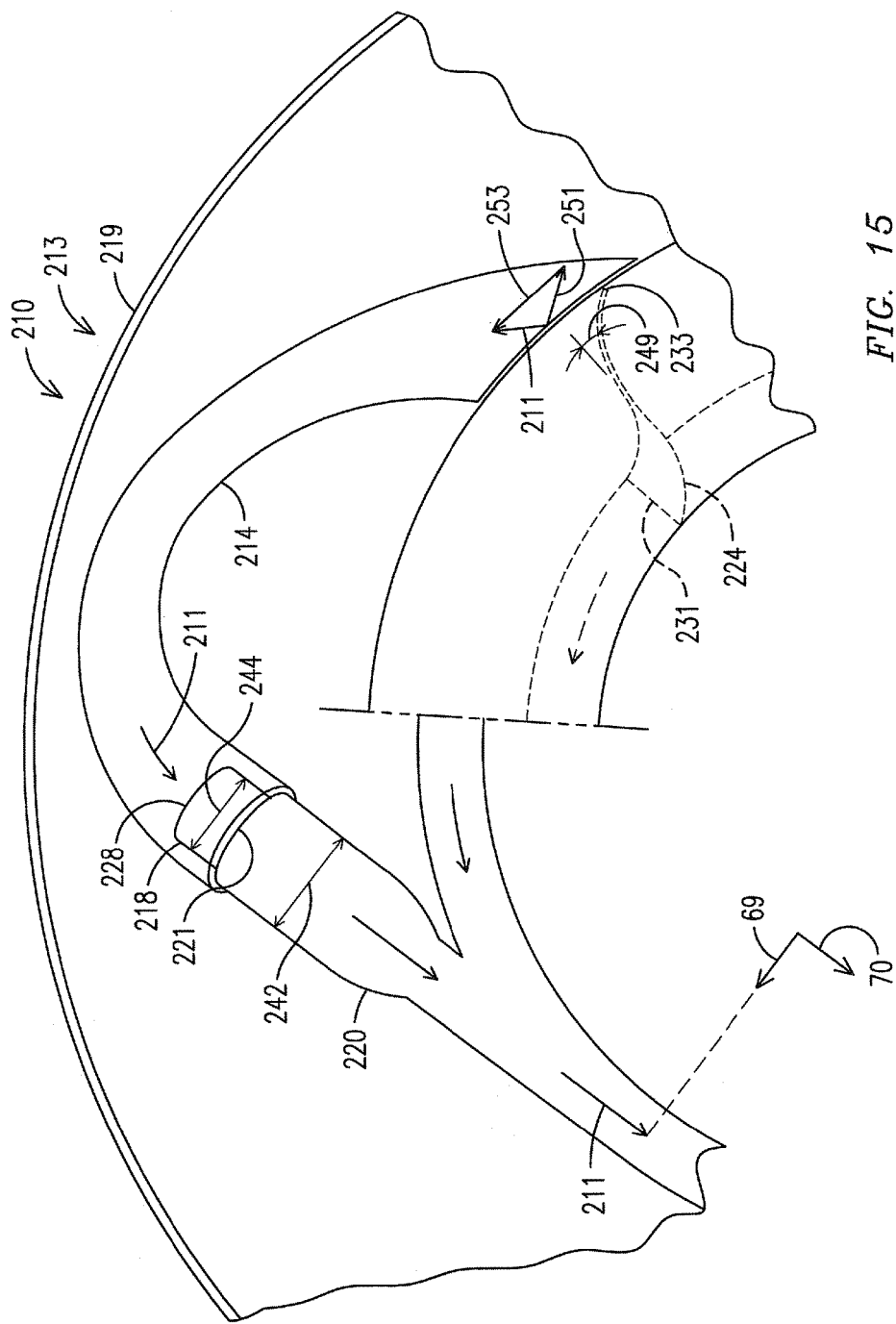
FIG. 15 is a partial longitudinal view of the pipe diffuser illustrated in FIG. 6.
Figure 16:
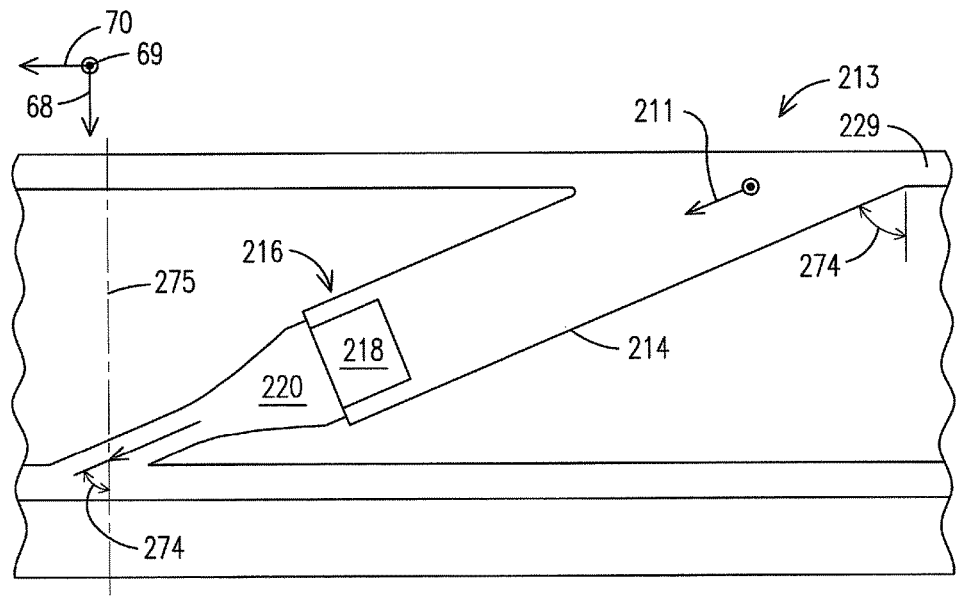
FIG. 16 is a partial radial view of the pipe diffuser illustrated in FIG. 6.

FIGS. 15-16 illustrate a respective cross-sectional view of the midframe portion 213 in the radial-tangential plane (FIG. 15) and in the longitudinal-tangential plane (FIG. 16). FIG. 15 illustrates an upstream longitudinal view of the midframe portion 213, in which the last stage blade 224 is positioned such that the trailing edge 233 is angled at a sweep angle 249 relative to the radial direction. Within the relative reference frame of the last stage blade 224, the air flow 251 is directed off the trailing edge 233 in a direction that is parallel to the trailing edge 233. The last stage blade 224 rotates within the radial-tangential plane of the midframe portion 213 with a rotational speed 253 in the tangential direction. Within the absolute reference frame of the gas turbine engine 210, the air flow 211 is directed in a mixed radial-tangential direction off the trailing edge 233, based on a vector sum of the air flow 251 (within the blade reference frame) and the rotational speed 253 of the blade 224. As illustrated in FIG. 15, the sweep angle 249 of the last stage blade 224 is adjusted, so that the air flow 211 coming off the trailing edge 233 is oriented into an inlet of the diffuser 214, within the radial-tangential plane. Within the radial-tangential plane, the diffuser 214 redirects the air flow 211 from the initial mixed radial-tangential direction at the inlet of the diffuser 214 to the tangential direction 70 at the inlet to the combustor head 218. As illustrated in FIG. 16, within the tangential-longitudinal plane, the sweep angle 249 of the trailing edge 233 (FIG. 15) causes the air flow 211 to initially travel in the radial-tangential plane (i.e., perpendicular to the longitudinal axis 275 in FIG. 16). As illustrated in FIG. 16, within the tangential-longitudinal plane, the diffuser 214 is aligned with an angular offset 274 in the tangential direction 70 relative to the longitudinal direction 68, to introduce a longitudinal turn in the air flow 211 passed into the inlet of the diffuser 214. In an exemplary embodiment of the present invention, the angular offset 274 is 70 degrees, for example. As illustrated in FIG. 16, the diffuser 214 is coupled to the combustor head 218 inlet such that the diffuser 214 is aligned parallel with the transition 220 and is centered with respect to the transition 220, such that the diffuser 214 and the transition 220 are both oriented along the angular offset 274 in the tangential direction 70 with respect to the longitudinal direction 68. As previously discussed, the sweep angle 249 of the trailing edge 233 (FIG. 15) is adjusted, such that the tangential velocity component of the air flow 211 incident into the diffuser 214 is correspondingly adjusted, to orient the air flow 211 into the inlet of the diffuser 214, within the radial-tangential plane. Similarly, within the longitudinal-tangential plane (FIG. 16), the adjustment of the sweep angle 249 of the trailing edge 233 adjusts the tangential velocity component of the air flow 211 incident into the diffuser 214, such that once the diffuser 214 initiates the longitudinal turn in the air flow 211, the air flow 211 is oriented within the diffuser 214 along the angular offset 274 within the longitudinal-tangential plane. The total angle of rotation of the air flow 211 within the midframe portion 213 from the compressor section 212 outlet to the combustor head 218 inlet is less than the total angle of rotation of the air flow 11 in the conventional midframe portion 13 between the compressor section outlet and the combustor head inlet. Additionally, the midframe portion 213 is designed to enhance a manufacturing cost efficiency of the midframe portion 213, rather than an aerodynamic efficiency during an operation of the midframe portion 213, as with the midframe portion 313 of FIGS. 7 and 9.

As illustrated in FIGS. 6 and 15, the diffuser 214 receives the mixed radial-tangential flow 211 and redirects the air flow 211 along the angular offset 274 in the tangential direction 70 with respect to the longitudinal direction 68 at the combustion head 218 outlet. The diffuser 214 of the midframe portion 213 receives the mixed radial-tangential flow 211 oriented at the initial radial-tangential direction based on the sweep angle 249, turns the radial flow 211 approximately 20 degrees in the longitudinal direction 68, after which the air flow 211 passes over a longitudinal distance 246 within the diffuser 214 before the diffuser 214 turns the air flow 211 along the angular offset 274 in the tangential direction 70 with respect to the longitudinal direction 68 at the combustion head 218 outlet. As illustrated in FIG. 15, the outer diameter 242 of the diffuser 214 outlet is sized to be greater than the outer diameter 244 of the combustion head 218 inlet, and the face 221 of the diffuser 214 outlet is aligned to be parallel with the face 228 of the combustion head 218 inlet, to align the air flow 211 from the diffuser 214 into the combustion head 218 inlet.

As illustrated in FIG. 6, all of the diffusers 214, the combustor heads 218 and the transitions 220 of the gas turbine engine 210 are enclosed within a single casing 219 that extends around the central axis (not shown), based on the annular configuration of the gas turbine engine 210. The single casing 219 forms a chamber 215 which can collect stagnant, hot air, during an operation of the gas turbine engine 210. To address this stagnant, hot air, an air flow is bled off from an intermediate stage 239 of the compressor section 212 upstream of the last stage blade 224, and is passed into the chamber 215, to circulate the stagnant, hot air within the chamber 215, such as in a vicinity of an inner surface of the casing 219. Additionally, the pressure of the air flow bled off from the intermediate stage 239 may be selected to be an intermediate pressure that is less than a static pressure of the air flow 211 within the combustion head 218 inlet (see FIG. 12), to establish a flow of air across a seal interface 241 between the diffuser 214 outlet and the combustion head 218 inlet, to disperse any stagnant air from within the seal interface 241 into the chamber 215, such as from a spring seal, for example.

Figure 17:
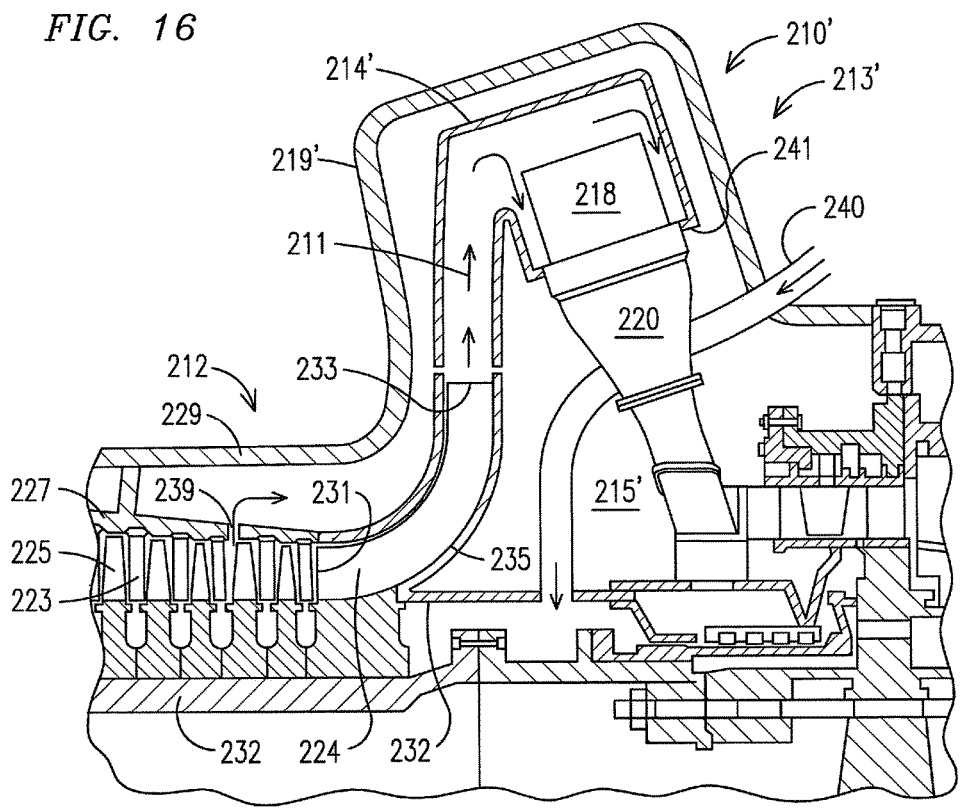
FIG. 17 is a schematic view of a compressor section with a radial outlet to a pipe diffuser within a turbine engine.

FIG. 17 illustrates an alternate embodiment of a midframe portion 213' of a gas turbine engine 210', which is similar to the midframe portion 213 of the gas turbine engine 210 of FIG. 6, with the exception that the diffuser 214' and the casing 219' are designed differently than the diffuser 214 and the casing 219 of the midframe portion 213 of the gas turbine engine 210. As discussed above, the diffuser 214 of the midframe portion 213 of FIG. 6 is designed to rotate the air flow 211 from the initial mixed radial-tangential direction by an angular offset 274 in the longitudinal direction 68, so that the air flow 211 passes along the longitudinal distance 246 within the diffuser 214 before the diffuser 214 directs the air flow 211 along the angular offset 274 (FIG. 16) at the combustion head 218 outlet, to be directed at the first stage blade of the turbine. However, the diffuser 214' of the midframe portion 213' is designed to receive the mixed radial-tangential flow 211 and turn the air flow 211 along the angular offset 274 in the tangential direction 70 at the combustion head 218 outlet, over a reduced longitudinal distance within the diffuser 214', as compared to the air flow 211 within the diffuser 214. Thus, the diffuser 214' is shaped with relatively abrupt outward and inward radial connecting channels. As a result, the diffuser 214' is positioned over a shorter longitudinal distance than the diffuser 214, and thus the midframe portion 213' of the gas turbine engine 210' utilizes less material and/or has a reduced longitudinal length than the midframe portion 213. As previously discussed, the midframe portions 213,213' of the gas turbine engines 210,210' replace a plurality of compressor stages with the last stage blade 224, and thus improve the manufacturing cost efficiency, as compared to a conventional midframe design. As discussed above, in addition to the diffuser 214' of the midframe portion 213' of FIG. 17, the casing 219' has a varied design from the casing 219 of the midframe portion 213 of FIG. 6. As discussed above, the casing 219 of the midframe portion 213 encloses all of the diffusers 214, the combustion heads 218 and the transitions 220 which encircle the central axis (not shown) of the gas turbine engine 210, in an annular configuration. In contrast with the single casing 219 of the midframe portion 213, that encloses all of the diffusers 214, the midframe portion 213' includes individual casings 219' which enclose a respective diffuser 214', combustor head 218 and transition 220. In an exemplary embodiment, the casing 219' may be shaped with a rectangular outer surface, to minimize a volume of a chamber 215' within the casing 219', such that hot stagnant air within the chamber 215' is minimized during an operation of the gas turbine engine 210'. As with the midframe portion 213 of FIG. 6, an air flow is bled off from the intermediate stage 239 of the compressor section 212, to pass the air flow into the chamber 215' to circulate any hot, stagnant air within the chamber 215', and to establish a pressure difference across a seal 241 between the diffuser 214' outlet and the combustor head 218 inlet, as in the midframe portion 213. As further illustrated in FIG. 17, rotor cooling injection pipes 240 receive cooled air from an external cooling reservoir (not shown) and pass this cooled air between adjacent transitions 220 of the midframe portion 213' to an inlet in the shaft cover 232, where an air flow is delivered to cool the blades 225 of the compressor section 212. The rotor cooling injection pipe may alternatively receive the cooled air from the chamber 215' and/or the intermediate stage 239 of the compressor section 212, for example.

C. Cowling

As discussed above, different embodiments of the present invention involve directing the mixed-air flow or radial air flow generated within the compressor section, the diffuser and/or a compressor-diffuser combination, to various destinations within the midframe portion of the gas turbine engine. For example, the mixed-air flow or radial air flow may be discharged from the diffuser outlet into the chamber of the midframe portion. In another example, the mixed-air flow or radial air flow may be directly coupled from the compressor outlet to a respective combustor head. However, rather than discharging the mixed-air flow or radial air flow into the chamber, the mixed-air flow or radial air flow may be used to cool the transition. During an operation of the gas turbine engine, the transition reaches high operating temperatures, particularly at a rear end of the transition adjacent to an outlet of the transition. Thus, the mixed-air flow or radial air flow from the compressor-diffuser outlet could be used to cool the rear end of the transition, to enhance the cooling efficiency of the transition and improve the overall operating efficiency of the gas turbine engine.

Figure 18:
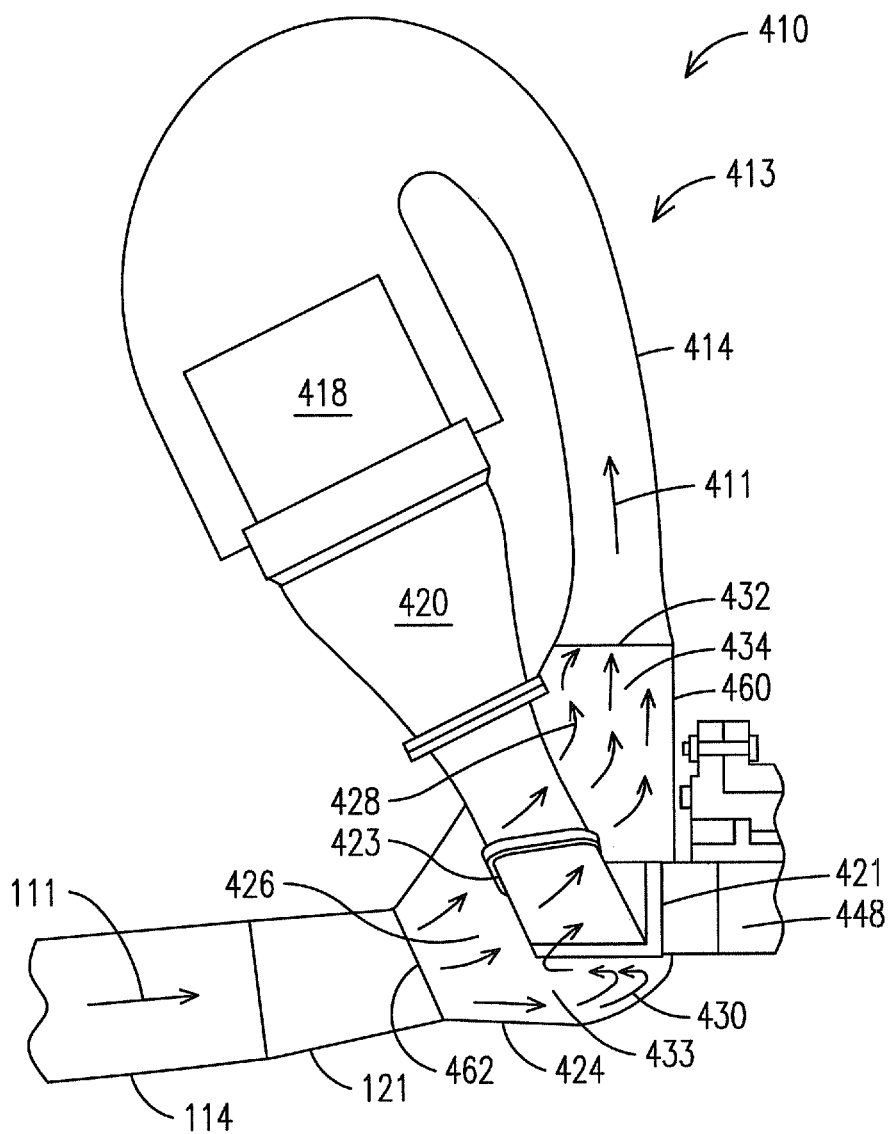
FIG. 18 is a plan view of a cowling encircling a rear end of a trans-vane design of a transition of a turbine engine.

FIG. 18 illustrates a midframe portion 413 of the gas turbine engine 410. The midframe portion 413 includes the diffuser 114 and the manifold 121 of FIG. 4 which collectively receive the mixed-air flow 111 from the combustion section 112 of the gas turbine engine. For the sake of clarity, the combustion section is not shown in FIG. 18, but the mixed-air flow 111 is directed along the diffuser 114 and the manifold 121. Unlike the midframe portion 113 of FIG. 4, where the diffuser 114 and the manifold 121 directed the mixed-air flow 111 from the compressor section 112 outlet directly into the combustion head 118 inlet, the diffuser 114 and the manifold 121 of the midframe portion 413 of FIG. 18 direct the mixed-air flow 111 into an inlet 462 of a cowling 460 that encompasses a transition 420 of the midframe portion 413. The cowling 460 includes an inner diameter 423 based on a diameter of an opening in the cowling 460 through which the transition 420 is received, where the inner diameter 423 is sized to an outer diameter of the transition 420 at the rear end 421, so that the cowling 460 encloses the rear end 421 of the transition 420 with the inner diameter 423 of the cowling 460 corresponding with the outer diameter of the transition 420 at the rear end 421. The cowling 460 extends outward from the opening with the inner diameter 423 to an outer diameter 424 that is greater than the outer diameter of the transition 420, such that an interior space 426 is formed between the inner diameter 423 and the outer diameter 424 of the cowling 460. The outer diameter 424 of the cowling 460 approaches the inner diameter 423 at the rear end 421 of the transition 420, as discussed below. The interior space 426 includes a lower radial space 433 positioned on a lower radial side of the transition 420 and an upper radial space 434 positioned on an upper radial side of the transition 420. As discussed above, the mixed-air flow 111 from the diffuser 114 and the manifold 121 is received through the inlet 462 and into the lower radial space 433 of the cowling 460. Upon entering the lower radial space 433, the mixed-air flow 111 separates into a first air flow 428 which passes from the lower radial space 433 around the transition 420 and into the outer radial space 434, before exiting through an outlet 432 of the cowling 460; and a second air flow 430 which remains within the lower radial space 433 and passes to the rear end 421. At the rear end 421, the outer diameter 424 approaches the inner diameter 423 of the cowling 460, to keep the second air flow 430 in the lower radial space 433 and decelerate the second air flow 430 at the rear end 421 to maximize thermal convection between the second air flow 430 and the rear end 421 of the transition 420. After the cowling 460 decelerates the second air flow 430 at the rear end 421 for thermal convection, the second air flow 430 reverses direction away from the rear end 421 to a region where the outer diameter 424 is greater than the inner diameter 423 so the second air flow 430 can pass around the transition 420 and enter the upper radial space 434 before exiting through the outlet 432.

Figure 19:
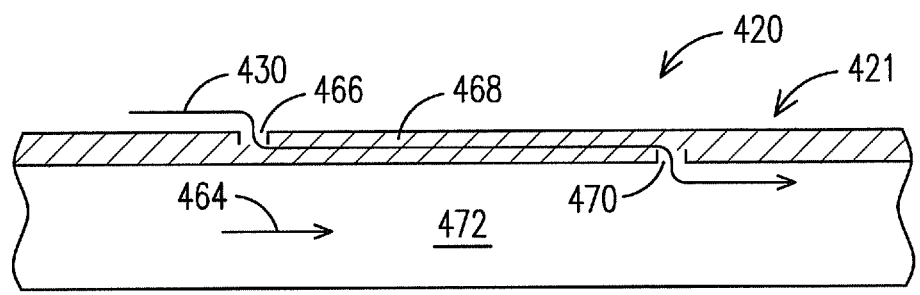
FIG. 19 is a cross-sectional view of the rear end of the transition illustrated in FIG. 18.

Although FIG. 18 illustrates that the second air flow 430 is passed to the rear end 421 and subsequently redirected back to a region of the cowling 460 where the second air flow 430 passes over the transition 420 into the upper radial space 434, an alternate embodiment may pass the second air flow 430 into the rear end 421 to cool the rear end 421 using a film cooling technique. As illustrated in FIG. 19, the second air flow 430 is directed to the rear end 421 of the transition 420 and into an inlet 466 of a conductive film 468 within the rear end 421 of the transition 420. As illustrated in FIG. 19, the second air flow 430 passes within the conductive film 468 of the rear end 421 of the transition 420, to cool the rear end 421, before exiting the conductive film 468 at an outlet 470 and entering a combustion gas flow 464 within an internal passage 472 of the transition 420 at the rear end 421. Although the cooling technique of FIG. 19 in which the second air flow 430 is directed into a conductive film 468 of the rear end 421 of the transition has an improved cooling efficiency over the cooling technique of FIG. 18 in which the second air flow 430 is directed against the rear end 421 for thermal convection, the cooling technique of FIG. 19 has a reduced aerodynamic efficiency than the cooling technique of FIG. 18 since the second air flow 430 enters the combustion gas flow 464 and thus is not directed into the combustion head 418. Thus, depending on the design priorities of the midframe portion, such as whether cooling efficiency or aerodynamic efficiency is a primary design objective, the convection cooling technique of FIG. 18 or the film cooling technique of FIG. 19 may be employed, for example.

As discussed above, the first and second air flow 428, 430 merge in the upper radial space 434 and exit through the outlet 432 of the cowling 460. As illustrated in FIG. 18, the outlet 432 of the cowling 460 is coupled to a diffuser 414 which has a similar shape as the diffuser 214 of FIG. 6, with a reverse orientation (in the longitudinal direction). The diffuser 414 has an inlet that is coupled to the outlet 432 of the cowling 460 and an outlet that is coupled to an inlet of the combustion head 418, in a similar manner that the outlet of the diffuser 214 of FIG. 6 is coupled to the inlet of the combustion head 218 inlet, as previously discussed. The first and second air flow 428, 430 merge to form the air flow 411 which is coupled into the diffuser 414 inlet and passes in an outer radial direction and is subsequently turned by the diffuser 414 in a downward radial direction and into the combustion head 418 inlet. In an exemplary embodiment, the transition 420 has a trans-vane design, and thus the diffuser 414 is further shaped to direct the air flow 411 at an angle in a tangential direction with respect to a longitudinal direction, at the angle 374 in the tangential direction 70 with respect to the longitudinal 68 direction, as previously discussed and illustrated in FIG. 9.

Although FIG. 18 illustrates that the mixed-air flow 111 is provided through the diffuser 114 and the manifold 121 to the cowling 460, the cowling 460 may receive an air flow from the chamber (not shown) after the diffuser 114 discharges an air flow into the chamber, for example. Additionally, for example, the cowling 460 may receive an air flow from an integrated diffuser, such as the diffuser 314 illustrated in FIGS. 7 and 9, for example, rather than from the combination of the diffuser 114 and the manifold 121, as illustrated in FIG. 18. Additionally, although FIG. 19 illustrates that the first and second air flow 428, 430 combine to form the air flow 411 which is directed into the diffuser 414 that directly couples the air flow 411 to the combustion head 418 inlet, the first and second air flow 428,430 need not be directly coupled to the combustion head 418 inlet through the diffuser 414, and may instead be directly discharged into the chamber (not shown), after which the air flows 428,430 randomly enter one of the combustion head 418 inlets. Additionally, the air flow 428,430 may instead be directly coupled from the cowling outlet 432 into a manifold which may or may not be a diffuser that directly couples the air flow 411 to the combustion head 418 inlet, for example.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A midframe portion of a gas turbine engine, comprising:
    a compressor section including a last stage blade and a plurality of blades positioned upstream of the last stage blade, said compressor section configured to introduce a radial velocity component into an air flow such that the air flow is discharged from an outlet of the compressor section to an annulus at a mixed direction based on a combined longitudinal velocity component and radial velocity component;
    a diffuser comprising structure within the annulus to separate the annulus into channels oriented in the mixed direction such that a respective portion of the air flow is discharged from a respective channel;
    a plurality of discrete combustor heads circumferentially arranged within a casing around a rotor assembly of the gas turbine engine in an annular configuration; and
    a plurality of manifolds circumferentially arranged within the casing around the rotor assembly, wherein each manifold is oriented in the mixed direction and comprises an inlet coupled to a respective one of the channels of the diffuser and an outlet attached to an inlet of a respective combustor head to couple the respective portion of the air flow from the diffuser to the inlet of the respective combustor head so that the respective portion of the air flow bypasses a chamber in the midframe portion, thus effectively reducing aerodynamic losses that otherwise would occur in said chamber,
    wherein the outlet of the compressor section includes an inner cone and an outer cone to encircle a shaft cover of the rotor assembly of the gas turbine engine;
    wherein the annulus is formed between the inner cone and the outer cone in a longitudinal direction, said annulus having an expanding area in the longitudinal direction;
    wherein an inner diameter of the inner cone radially increases in the longitudinal direction relative to the shaft cover,
    wherein each channel is formed by a respective pair of vanes positioned within the annulus, to separate the annulus into the respective channel;
    wherein the respective channel is oriented in the mixed direction to receive the air flow discharged from the compressor section; and
    wherein an area of the respective channel expands in the longitudinal direction.

2. The midframe portion of claim 1, wherein said last stage blade includes:
    a leading edge aligned to be parallel with a leading edge of the plurality of blades positioned upstream of the last stage blade; and a trailing edge radially tilted outward relative to a trailing edge of the blades positioned upstream of the last stage blade;
    wherein an inner diameter of the trailing edge is radially shifted outward from an inner diameter of the leading edge at a shaft cover of the rotor assembly of the gas turbine engine.

3. The midframe portion of claim 1, wherein the outlet of each manifold is only attached to the inlet of the respective combustor head and is not attached to inlets of the plurality of combustor heads other than the respective combustor head to directly couple the respective portion of air to only the inlet of the respective combustor head.

4. The midframe portion of claim 1, further comprising:
    an extraction pipe configured to draw at least some air from the chamber to a cooler element; and an injection pipe configured to couple air from the cooler element to the shaft cover of the midframe portion, to direct an air flow to a first stage blade of a turbine section;
    wherein the extraction pipe and the injection pipe extend through a respective opening in the pair of vanes.

5. The midframe portion of claim 1, further comprising a plurality of compressor vanes within the compressor section; wherein said compressor vanes are configured to align a tangential angle of the air flow with respect to the longitudinal direction to enhance a passage of the air flow discharged from the compressor section into the respective channel.

6. The midframe portion of claim 5, wherein said compressor vanes are configured to align the tangential angle of the air flow along a chord length of the respective pair of vanes of the diffuser, to distribute the air flow between adjacent channels.

7. The midframe portion of claim 5, wherein said compressor vanes are configured to align the tangential angle of the air flow along the respective channel between the respective pair of vanes, to enhance the passage of the air flow into the respective diffuser.

8. The midframe portion of claim 1, wherein, based on the radial velocity component introduced to the airflow by the compressor section, the airflow undergoes a reduced angular rotation effective for reducing aerodynamic losses when travelling in a longitudinal-radial plane between the discharge from the compressor section and entry into the inlet of the respective combustor head.

9. The midframe portion of claim 1, wherein the diffuser is configured to receive the air flow discharged from the compressor section outlet; said diffuser configured to introduce a second radial velocity component into the air flow; wherein said diffuser is configured to discharge the air flow with a radial velocity component greater than the radial velocity component introduced by the compressor section.

* * * * *